United States Patent
Raess et al.

(10) Patent No.: US 12,045,249 B2
(45) Date of Patent: Jul. 23, 2024

(54) SEARCH-BASED DOCUMENT USER INTERFACES

(71) Applicant: Google LLC, Mountain View, CA (US)

(72) Inventors: Simon Raess, New York, NY (US); Ronald Ho, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/867,463

(22) Filed: Jul. 18, 2022

(65) Prior Publication Data

US 2023/0004558 A1 Jan. 5, 2023

Related U.S. Application Data

(63) Continuation of application No. 13/743,562, filed on Jan. 17, 2013, now Pat. No. 11,392,601.

(60) Provisional application No. 61/588,107, filed on Jan. 18, 2012.

(51) Int. Cl.
*G06F 16/248* (2019.01)
(52) U.S. Cl.
CPC ................. *G06F 16/248* (2019.01)
(58) Field of Classification Search
CPC ...................................... G06F 16/248
See application file for complete search history.

(56) References Cited

U.S. PATENT DOCUMENTS

| | | | |
|---|---|---|---|
| 5,530,869 A | 6/1996 | Salle | |
| 7,089,278 B1 | 8/2006 | Churchill et al. | |
| 7,689,933 B1 | 3/2010 | Parsons | |
| 7,890,886 B2 | 2/2011 | Matthews et al. | |
| 7,937,663 B2* | 5/2011 | Parker | G06F 3/0483 715/753 |
| 8,566,711 B1 | 10/2013 | Srivastava | |
| 8,631,348 B2 | 1/2014 | Petri et al. | |
| 8,819,068 B1 | 8/2014 | Knote et al. | |
| 2004/0001099 A1 | 1/2004 | Reynar et al. | |
| 2005/0055337 A1 | 3/2005 | Bebo et al. | |
| 2006/0036945 A1 | 2/2006 | Radtke et al. | |
| 2006/0277492 A1 | 12/2006 | Matthews et al. | |
| 2006/0282790 A1 | 12/2006 | Matthews et al. | |
| 2007/0016651 A1 | 1/2007 | Blagsvedt et al. | |
| 2007/0033172 A1 | 2/2007 | Williams et al. | |
| 2007/0174350 A1 | 7/2007 | Pell et al. | |

(Continued)

OTHER PUBLICATIONS

Robbins, vi Editor Pocket Reference, pp. 4, 26, 31, 42-43, 53-54 (Year: 1999).*

*Primary Examiner* — Albert M Phillips, III
(74) *Attorney, Agent, or Firm* — Lowenstein Sandler LLP

(57) ABSTRACT

A method includes providing for display at a user device associated with a user a graphical user interface (GUI) of an electronic document editor application of an electronic document system. The GUI includes a document view to display at least a portion of an electronic document that is editable by the user of a first users and a search region to receive one or more search terms. The method includes receiving an indication of a user activation of the search region. Responsive to receiving the indication of the user activation of the search region, the method determines a subset of document operations, among multiple document operations, based on one or more criteria. The method provides, to the user device, an indication of the subset of document operations for display at the GUI as commands for user selection.

20 Claims, 16 Drawing Sheets

(56) References Cited

U.S. PATENT DOCUMENTS

| | | |
|---|---|---|
| 2009/0019379 A1 | 1/2009 | Pendergast et al. |
| 2009/0094554 A1 | 4/2009 | Karstens |
| 2009/0144658 A1 | 6/2009 | Petri et al. |
| 2009/0216696 A1 | 8/2009 | Downs et al. |
| 2009/0292930 A1 | 11/2009 | Marano et al. |
| 2009/0313574 A1 | 12/2009 | Shih et al. |
| 2010/0031137 A1 | 2/2010 | Amaral et al. |
| 2010/0082670 A1 | 4/2010 | Chan et al. |
| 2010/0082709 A1 | 4/2010 | Yamamoto |
| 2010/0205530 A1 | 8/2010 | Butin et al. |
| 2010/0281362 A1 | 11/2010 | Bailor et al. |
| 2010/0299201 A1 | 11/2010 | Thrasher |
| 2011/0314024 A1 | 12/2011 | Chang et al. |
| 2012/0272144 A1 | 10/2012 | Radakovitz et al. |
| 2013/0019175 A1 | 1/2013 | Kotler et al. |
| 2013/0155071 A1 | 6/2013 | Chan et al. |

\* cited by examiner

| 504 | 506 | 508 | 510 | 512 | 514 |
|---|---|---|---|---|---|
| insert image | freq-1 | any | any | photo; picture; | |
| make a copy | freq-2 | any | any | save as; save; | open; new document |
| bold | freq-3 | text | any | emphasize; bolden; | unbold |
| line thickness | freq-4 | line | any | line width; line properties | |
| insert row | freq-5 | table | any | add row; table properties; | delete row; delete table; |
| pivot table | freq-6 | cell | financial analyst | table summary; | |
| drucken | freq-7 | any | any | print; | |
| ... | ... | ... | ... | ... | ... |

Global document operation data 500

Figure 5A

606 In response to detecting the activation of the document operation search region, display a plurality of document operation labels, including multiple document operation labels corresponding to popular document operations. Each document operation label corresponds to a respective document operation.

> 620 The multiple document operation labels corresponding to popular document operations include one or more document operation labels selected in accordance with frequency of use by a community of users > 622 The multiple document operation labels corresponding to popular document operations include one or more document operation labels selected in accordance with frequency of use by a respective user of the computer system 624 The plurality of document operation labels further includes one or more suggested document operation labels distinct from the multiple document operation labels corresponding to popular document operations > 626 Concurrently display a location indicator that corresponds to a respective location of the document. The one or more suggested document operation labels include at least one document operation label selected in accordance with the respective location corresponding to the location indicator.

> 628 The one or more suggested document operation labels include at least one document operation label selected in accordance with the displayed portion of the document > 630 Concurrently display a location indicator that corresponds to a respective location of the document. The one or more suggested document operation labels include at least one document operation label selected independently of the respective location corresponding to the location indicator or the displayed portion of the document.

> 632 The one or more suggested document operation labels include at least one document operation label selected in accordance with a selected document object in the document > 634 The plurality of document operation labels includes one or more promoted document operation labels distinct from the multiple document operation labels corresponding to popular document operations

Figure 6B

910 Select a plurality of document operation labels at least in accordance with user data and user-interface data corresponding to a respective user of the computer system 918 The user data identifies a geographic location of the respective user. Select at least a subset of the plurality of document operation labels in accordance with the location of the respective user.

920 The user data identifies a job function of the respective user. Select at least a subset of the plurality of document operation labels in accordance with the job function of the respective user.

922 The user data includes a feature search history identifying a plurality of search queries that have been used by the respective user to identify one or more document operations. Select at least a subset of the plurality of document operation labels in accordance with the feature search history.

924 The user interface data identifies one or more visible objects in the respective document. Select at least a subset of the plurality of document operation labels in accordance with at least one of the one or more visible objects.

926 The user interface data identifies one or more selected objects in the respective document. Select at least a subset of the plurality of document operation labels in accordance with at least one of the one or more selected objects.

928 The user interface data identifies one or more document operation labels in an undo stack or a redo stack. Select at least a subset of the plurality of document operation labels in accordance with at least one of the one or more document operation labels in the undo stack or the redo stack.

930 The user interface data identifies a cursor location in the respective document. Select at least a subset of the plurality of document operation labels in accordance with the cursor location in the respective document.

Figure 9B

910 Select a plurality of document operation labels at least in accordance with user data and user-interface data corresponding to a respective user of the computer system 932 Receive a search query from the respective user; and select at least a subset of the plurality of document operation labels in accordance with: the search query, user data and user-interface data corresponding to the respective user, and user data and user-interface data corresponding to a community of users 934 Receive a search query from the respective user. Identify candidate document operation labels including: one or more document operation labels selected in accordance with the search query, one or more document operation labels selected in accordance with user data corresponding to the respective user, one or more document operation labels selected in accordance with user-interface data corresponding to the respective user, one or more document operation labels selected in accordance with user data corresponding to a community of users, and one or more document operation labels selected in accordance with user-interface data corresponding to the community of users. Select at least a subset of the candidate document operation labels for display to the respective user.

936 Select one or more document operation labels corresponding to one or more document operations used with respect to one or more documents related to the respective document 938 The one or more related documents and the respective document are included in a same document collection 940 Each document is associated with a respective domain, and the one or more related documents and the respective document are associated with a same domain

Figure 9C

SEARCH-BASED DOCUMENT USER INTERFACES

CLAIM FOR PRIORITY

This application is a continuation application of U.S. patent application Ser. No. 13/743,562, filed Jan. 17, 2013, which claims the benefit of Provisional Application No. 61/588,107, filed Jan. 18, 2012, the entire contents of both are hereby incorporated by reference.

TECHNICAL FIELD

The disclosed embodiments relate generally to electronic document editors.

BACKGROUND

Recently, the use of electronic document editors has increased significantly. Electronic document editors (e.g., word processors) typically provide various document operations, such as opening a document, saving a document, changing regular fonts to bold fonts, printing a document, etc. However, with the existing electronic document editors, finding and performing relevant document operations among numerous document operations often requires extra time and efforts. In some cases, the existing electronic document editors create a significant cognitive burden on a user when finding and performing relevant document operations.

Thus, there is a need for a new method and system for finding and performing document operations in an electronic document editor.

SUMMARY

A number of embodiments (e.g., of server systems, client systems or devices, and methods of operating such systems or devices) that overcome the limitations and disadvantages described above are presented in more detail below. These embodiments provide methods, systems, and graphical user interfaces (GUIs) for finding and performing a document operation in an electronic document editor.

As described in more detail below, some embodiments described herein involve a computer-implemented method performed by a computer system having one or more processors and memory storing one or more programs executed by the one or more processors. The method includes concurrently displaying at least a portion of a document and a document operation search region for receiving one or more search terms, and detecting user activation of the document operation search region. The method includes, in response to detecting the activation of the document operation search region, displaying a plurality of document operation labels that includes multiple document operation labels corresponding to popular document operations. Each document operation label corresponds to a respective document operation. The method also includes detecting user selection of a respective document operation label of the plurality of document operation labels, and performing the respective document operation that corresponds to the respective document operation label.

In accordance with some embodiments, a computer-implemented method is performed by a computer system having one or more processors and memory storing one or more programs executed by the one or more processors. The method is performed at the computer system, prior to a respective user of the computer system signaling completion of a search query. The method includes receiving a partial search query, and predicting from the partial search query one or more document operation labels. Each document operation label corresponds to a respective document operation. The method also includes displaying at least a subset of the one or more document operation labels, and receiving user selection of a respective document operation label from the displayed subset of the one or more document operation labels. The method furthermore includes, in response to detecting the user selection, performing the respective document operation that corresponds to the respective document operation label.

In accordance with some embodiments, a computer-implemented method is performed by a computer system having one or more processors and memory storing one or more programs executed by the one or more processors. The method includes concurrently displaying at least a portion of a document and a document operation search region for receiving a search query, receiving the search query in the document operation search region, and identifying one or more document operation labels that correspond to the search query. Each document operation label corresponds to a respective document operation. The method also includes displaying at least a subset of the one or more document operation labels, receiving user selection of a respective document operation label from the displayed subset of the one or more identified document operation labels, and in response to detecting the user selection, performing the respective document operation that corresponds to the respective document operation label.

In accordance with some embodiments, a computer-implemented method for providing document operation labels for use with a respective document is performed at a server system having one or more processors and memory storing one or more programs executed by the one or more processors. The method includes displaying at least a portion of the respective document, and while displaying at least the portion of the respective document, receiving a request for document operation labels. The document operation labels correspond to respective document operations. The method also includes, in response to receiving the request for document operation labels, selecting a plurality of document operation labels at least in accordance with user data and user-interface data corresponding to a respective user of the computer system, and providing the plurality of document operation labels for display to the respective user.

In accordance with some embodiments, a system includes one or more processors and memory storing one or more programs for execution by the one or more processors. The one or more programs include instructions for performing any of the aforementioned methods.

In accordance with some embodiments, a non-transitory computer-readable storage medium stores one or more programs for execution by one or more processors in a computer system. The one or more programs include instructions for performing any of the aforementioned methods.

Thus, embodiments described herein allow users to find and perform document operations faster and more efficiently.

BRIEF DESCRIPTION OF THE DRAWINGS

For a better understanding of aforementioned embodiments as well as additional aspects and embodiments thereof, reference should be made to the Description of Embodiments below, in conjunction with the following drawings in which like reference numerals refer to corresponding parts throughout the figures.

FIGS. 5A-5B are block diagrams illustrating exemplary global document operation data and user document operation data, in accordance with some embodiments.

FIGS. 6A-6B are flowcharts representing a method for displaying a plurality of document operation labels, including multiple document operation labels corresponding to popular document operations, in accordance with some embodiments.

FIGS. 9A-9C are flowcharts representing a method for selecting a plurality of document operation labels, in accordance with some embodiments.

Like reference numerals refer to corresponding parts throughout the drawings.

DESCRIPTION OF EMBODIMENTS

Methods and systems for displaying selected document operation labels are described. Reference will be made to certain embodiments, examples of which are illustrated in the accompanying drawings.

Moreover, in the following description, numerous specific details are set forth to provide a thorough understanding of the embodiments. However, it will be apparent to one of ordinary skill in the art that some embodiments may be practiced without these particular details. In other instances, methods, procedures, components, and networks that are well-known to those of ordinary skill in the art are not described in detail to avoid obscuring aspects of the embodiments described herein.

It will also be understood that, although the terms first, second, etc. may be used herein to describe various elements, these elements should not be limited by these terms. These terms are only used to distinguish one element from another. For example, a first document could be termed a second document, and, similarly, a second document could be termed a first document. The first document and the second document are both documents, but they are not the same document.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining," "in response to determining," "in accordance with a determination," "upon detecting" or "in response to detecting" that the stated condition precedent is true, depending on the context.

Figure 1:
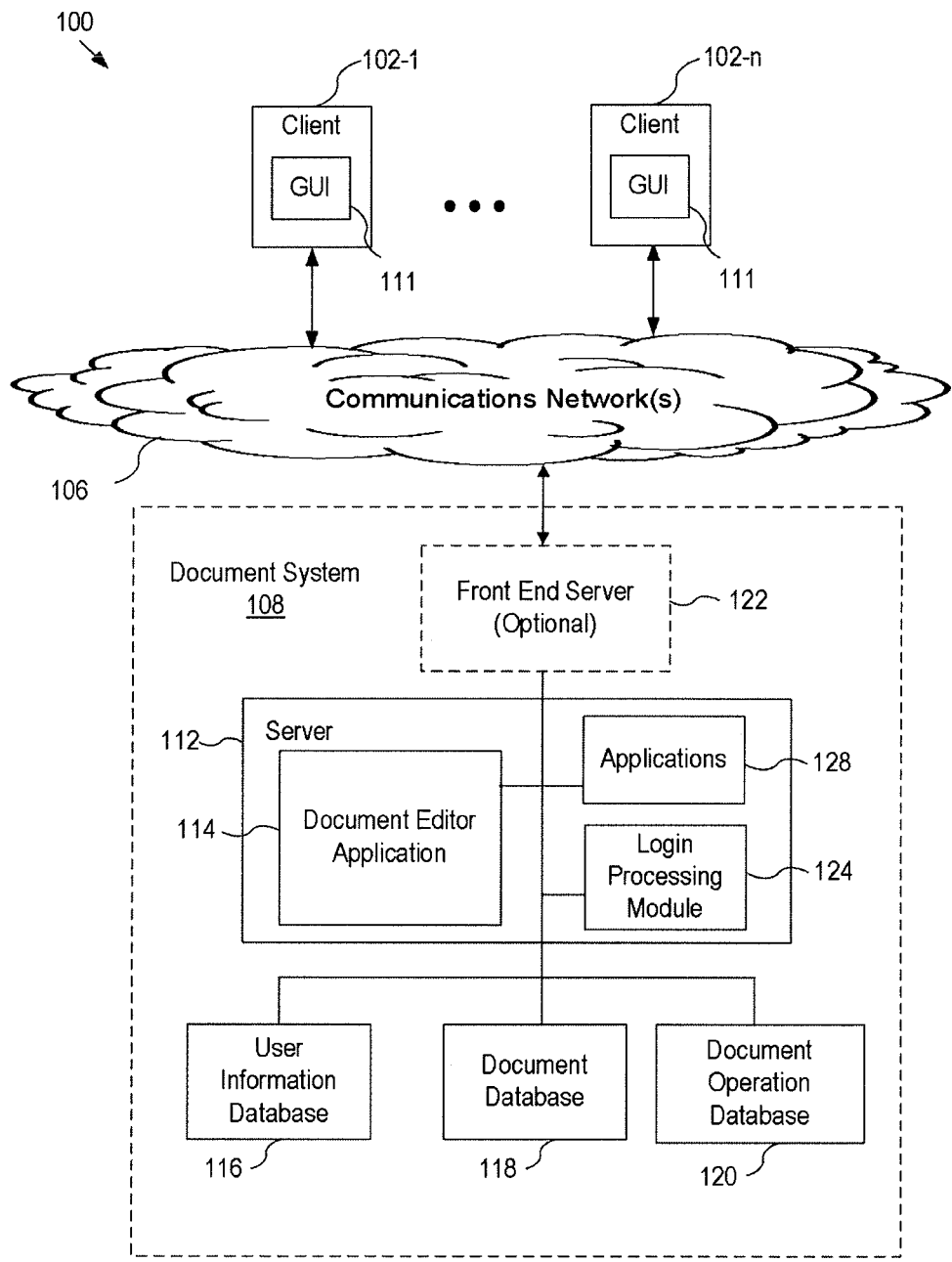
FIG. 1 is a block diagram illustrating an exemplary distributed computer system, in accordance with some embodiments.

FIG. 1 is a block diagram illustrating exemplary distributed computer system 100, according to certain embodiments. In FIG. 1, system 100 includes one or more client computers 102, communications network 106, and document system 108. Various embodiments of document system 108 implement the methods described in this document.

Client computers 102 can be any of a number of computing devices (e.g., Internet kiosk, personal digital assistant, cell phone, gaming device, desktop computer, laptop computer, tablet computer, handheld computer, or combinations thereof) used to enable the activities described below. Client computer(s) 102 is also referred to herein as client(s), client device(s) or client system(s). Client 102 typically includes a graphical user interface (GUI) 111. Client 102 is described in greater detail below with reference to FIG. 3. Client 102 is connected to document system 108 via communications network 106. As described in more detail below, GUI 111 of client 102 is used to display one or more documents and information items. Document system 108 provides document services (e.g., document authoring, editing, sharing, mailing, and/or viewing services) to a community of users (e.g., the employees of a company, the members of an organization or group, friends, family members, etc.) who access document system 108 from clients 102.

Document system 108 includes one or more servers, such as server 112, connected to communications network 106. Optionally, the one or more servers are connected to communications network 106 via front end server 122. In some embodiments, front end server 122 conveys (and optionally parses) inbound requests to the appropriate server of document system 108, and formats responses and/or other information being sent to other servers or clients in response to requests. Front end server 122, if present, may be a web server providing web based access to document system 108.

In some embodiments, document system 108 includes user information database 116, document database 118, and document operation database 120. In some embodiments, document system 108 also includes or has access to one or more other databases, such as a login database (not shown), which maintains login information. Server 112 includes document editor application 114, login processing module 124, and applications 128. Server 112 communicates with databases internal to document system 108, such as user information database 116, document database 118, and document operation database 120 using a local area network, by internal communication busses, or by any other appropriate mechanism or combination of mechanism.

Server 112 is also referred to herein as a server system. Server 112 communicates with clients 102 via front end server 122 (if present) and communications network(s) 106. In some embodiments, communications network 106 is the Internet. In other embodiments, communications network 106 can be any local area network (LAN), wide area network (WAN), metropolitan area network, or a combination of such networks. In some embodiments, server 112 is a web server that manages document editing requests using appropriate communication protocols. Alternatively, if server 112 is used within an intranet, and thus it may be called an intranet server.

Applications 128 include application programs used for managing an online document system. In some embodiments, applications 128 also include a user information processing module (not shown), where the user information processing module assists in accessing and updating user information database 116. User information database 116 stores information associated with the users of document system 108, for example user preferences, and/or display styles. In some implementations, user information database 116 also includes login information (e.g., user names, passwords, other authentication information, etc.). Document database 118 typically stores information concerning various types of documents as well as data (e.g., document contents and/or document files). Document operation database 120, if associated with document system 108, stores information concerning various document operations (e.g., authoring and editing operations, such as opening, saving, underlining, highlighting, inserting a text, inserting a table, etc.) provided by document system 108. In some embodiments where document system 108 is not associated with a document operation database 120, information concerning the document operations is included in application 128, instead of using document operation database 120.

Document editor application 114 provides document editing services. In some embodiments, document editor application 114 retrieves document information from document database 118, and sends at least a subset of the document information to a respective client 102. Document editor application 114 typically receives document editing requests from a respective client 102, and modifies the document information in accordance with the document editing requests. Alternatively, document editor application 114 provides a set of instructions such that a respective client 102 modifies the document information. In some embodiments, document editor application 114 assists in accessing and updating document database 118, and in some embodiments, document editor application 114 also assists in accessing and updating user information database 116 and/or document operation database 120. In some embodiments, login processing module 124 assists in accessing and updating user information database 116 when user information database 116 includes login information.

In some embodiments, document database 118 stores supplemental information (e.g., metadata) concerning various documents in the document database. A non-exhaustive set of examples of such information includes document identifier (document ID), author, access control list, document size, timestamps (e.g., timestamps for one or more of creation date, revision history, last updated time, last accessed time, etc.), and document type (e.g., word processor document, spreadsheet, presentation file, etc.). In some embodiments, document database 118 also stores document data (e.g., contents) or information about a location of document data (e.g., a pointer to a remote server or a document file stored at the remote server).

In some embodiments, user information database 116 includes user information records having information relevant to the display of document information. For example, the user information record for a respective user may include, in addition to identifying information for the user, document folders, and default display settings (e.g., display of a particular document, content of a particular folder, a list of documents associated with a particular document processing application (such as a word processor application, a spreadsheet application, or a presentation application), or a list of documents that the user has accessed, or created, or that are otherwise associated with the user. In some embodiments, user information database 116 includes user information records having information regarding a set selected from: geographic locations of respective users, job functions of respective users (e.g., job title and/or functional group), one or more associated organizations (e.g., employer(s), school(s), groups, etc.), and contacts (e.g., email addresses and/or phone numbers of users in an address book of each user).

In some embodiments, document operation database 120 includes various information concerning document operations supported by document system 108. For example, document operation database 120 may include information indicating how many times a particular document operation has been used by a community of users. Some of the information that may be included in document operation database 120 is described in detail below with respect to FIGS. SA-5B.

In essence, server 112 is configured to manage certain aspects of document system 108, including document editing requests from a respective client 102.

Optionally, document system 108 is implemented as part of a document sharing system that provides document services (e.g., document authoring, editing, sharing, mailing, and/or viewing services) to a community of users (e.g., the employees of a company, the students of a school, the members of an organization or group, etc.).

In some embodiments, fewer and/or additional modules, functions or databases are included in document system 108 and server 112. The modules shown in document system 108 and server 112 represent functions performed in certain embodiments.

Figure 2:
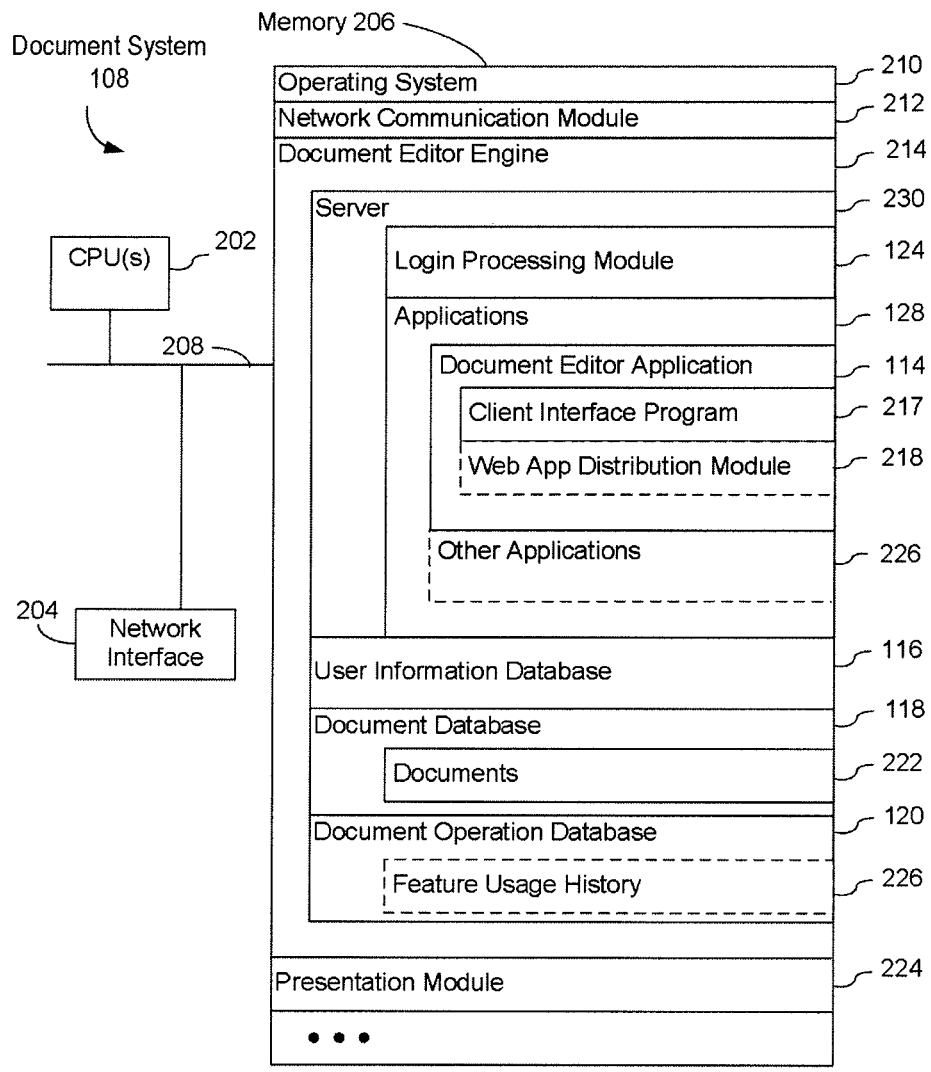
FIG. 2 is a block diagram illustrating a document system, in accordance with some embodiments.

FIG. 2 is a block diagram illustrating document system 108 in accordance with some embodiments. Document system 108 typically includes one or more processing units (CPUs) 202, one or more network or other communications interfaces 204, memory 206, and one or more communication buses 208 for interconnecting these components. In some embodiments, communication buses 208 include circuitry (sometimes called a chipset) that interconnects and controls communications between system components. In some embodiments, document system 108 includes a user interface (not shown)(e.g., a user interface having a display device, a keyboard, and a mouse or other pointing device), but more typically document system 108 is controlled from and accessed by various client systems.

Memory 206 of document system 108 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a non-transitory computer readable storage medium. In some embodiments, memory 206 or the computer readable storage medium of memory 206 stores the following programs, modules and data structures, or a subset thereof:

operating system 210 that includes procedures for handling various basic system services and for performing hardware dependent tasks;

network communication module (or instructions) 212 that is used for connecting document system 108 to other computers (e.g., clients 102) via one or more network interfaces 204 and one or more communications networks 106 (FIG. 1), such as the Internet, other wide area networks, local area networks, metropolitan area networks, and so on;

document editor engine 214 that receives document editing requests from and provides responses to clients 102; and presentation module 224 that formats results from document editor engine 214 for display at respective clients; for example, presentation module 224 may generate a web page or XML document that includes document information; in some embodiments, presentation module 224 is executed by front end server 122, which comprises one of the servers implementing document system 108; optionally presentation module 224 is a module of document editor engine 214.

In some embodiments, document editor engine 214 includes the following programs, modules and data structures, or a subset or superset thereof:

one or more server modules 230, corresponding to server 112 in FIG. 1, for managing certain aspects of document system 108 including login processing module 124, and applications 128, including document editor application 114 for performing the primary functions of an online document system; applications 128 may optionally include other applications 226;

user information database 116 that stores records for respective users;

document database 118 that stores documents 222 (e.g., document contents and/or document files), and possibly other document data as well (e.g., author, access control list, time stamps, document size, document type, etc.); and document operation database 120 that stores document operation data; in some embodiments, document operation database 120 includes feature usage history 226, which indicates document operations (also called features herein) that have been used by respective users.

In some embodiments, document editor application 114 includes client interface program (or module) 217 for receiving document information requests from clients 102 and generating responses to the requests. Document editor application 114 may optionally include web application distribution module 218 for distributing a set of instructions to enable document editing operations at clients 102 (FIG. 1). In some embodiments, the set of instructions are sent to clients 102 as embedded instructions (e.g., instructions embedded in a webpage).

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, one or more databases described herein, such as user information database 116, are part of or stored within server 112. In other embodiments, one or more databases described herein, such as user information database 116, are implemented using one or more servers whose primary function is to store and process user information. In some embodiments, document database 118 includes user database 116, or vice versa. In some embodiments, document database 118 includes document operation database 120, or vice versa. In some embodiments, document database 118 and/or document operation database 120 are implemented on one or more remote servers. In some embodiments, feature usage history 226 is included in user information database 116.

The number of servers used to implement document system 108 and how features are allocated among them will vary from one implementation to another, and may depend in part on the amount of data stored by document system 108, and may also dependent on the amount of data traffic that document system 108 must handle during peak usage periods as well as during average usage periods. Moreover, one or more of the blocks (e.g., server 112, document database 118, etc.) in FIG. 1 may be implemented on one or more servers designed to provide the described functionality. Although the description herein refers to certain features implemented in client 102 and certain features implemented in server 112, the embodiments are not limited to such distinctions. For example, features described herein as being part of server 112 can be implemented in whole or in part in client 102, and vice versa (e.g., at least a portion of feature usage history 226 may be included in client 102).

Figure 3:
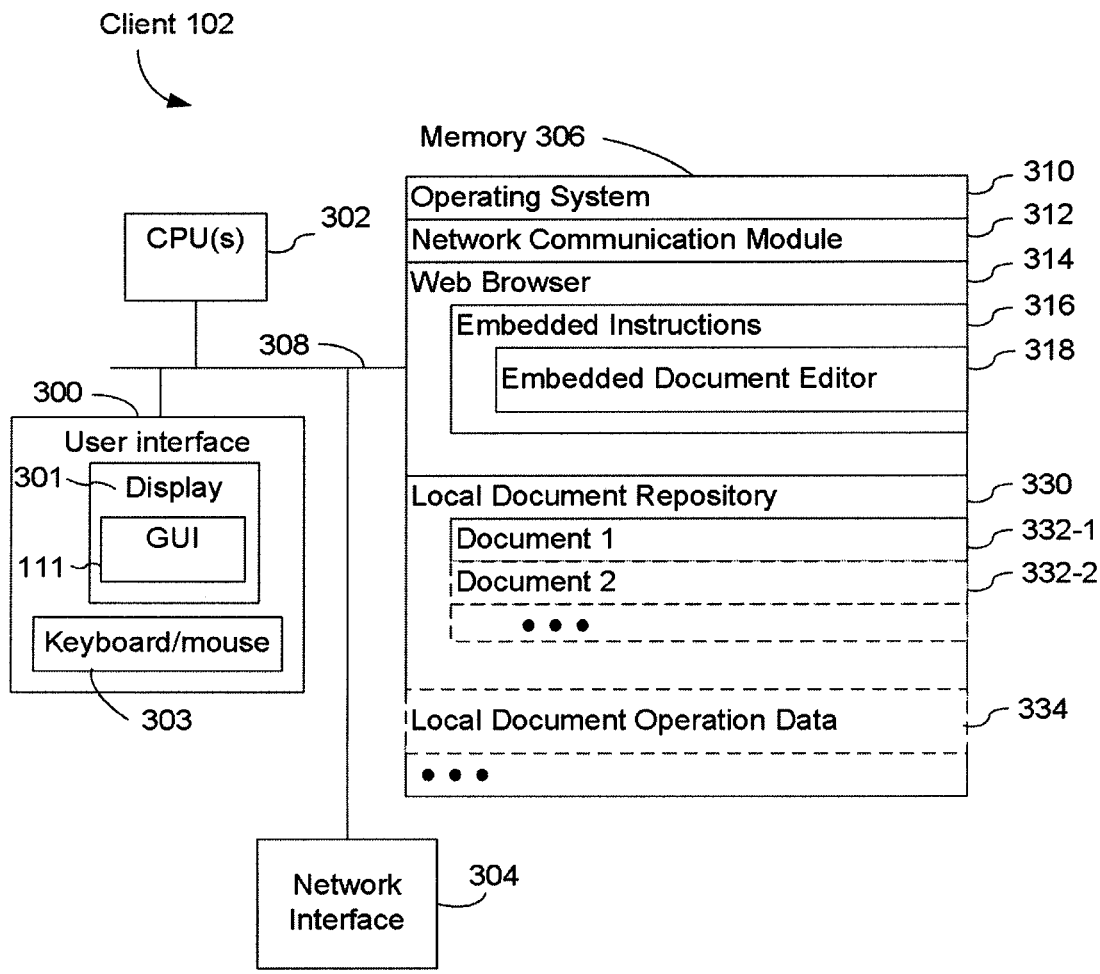
FIG. 3 is a block diagram illustrating a client, in accordance with some embodiments.

FIG. 3 is a block diagram illustrating client 102, also called a client system or a client device, in accordance with some embodiments. Client 102 is configured for use by a subscriber (also herein called "the user") of document system 108. Client 102 includes user interface 300, which typically includes display device 301, and one or more input devices 303 such as a keyboard and a mouse or other pointing device. As noted above, client 102 includes graphical user interface (GUI) 111, which is displayed on display device 301. Client 102 typically includes one or more processing units (CPUs) 302, one or more network or other network communications interfaces 304, memory 306, and one or more communication buses 308 for interconnecting these components. Communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a non-transitory computer readable storage medium. In some embodiments, memory 306 or the computer readable storage medium of memory 306 stores the following programs, modules and data structures, or a subset thereof:

operating System 310 that includes procedures for handling various basic system services and for performing hardware dependent tasks;

network communication module (or instructions) 312 that is used for connecting client 102 to other computers (e.g., document system 108 and other clients 102) via one or more network interfaces 304 and one or more communications networks 106 (FIG. 1), such as the Internet, other wide area networks, local area networks, metropolitan area networks, and so on;

web browser application 314, which processes and initiates display of a web document (e.g., 332-1 and/or 332-2) in GUI 111;

(optional) local document repository 330, which includes a plurality of documents (e.g., document 1 (332-1), document 2 (332-2), etc.); a respective document is typically a webpage (or XML document or the like) received from document system 108; in some embodiments, local document repository 330 also includes documents of other document types (e.g., proprietary document formats used by word processor applications, spreadsheet applications, presentation applications, etc.); and (optional) local document operation data 334.

In some embodiments, local document operation data 334 includes a copy of at least a subset of document operation data stored in document operation database 120 (FIG. 2). Local document operation data 334 may be used to improve the speed of performing certain tasks with respect to document operations (e.g., identifying a set of document operations or document operation labels in accordance with predefined criteria). In some embodiments, document operation data that is unique to a respective user of respective client 102 is stored in local document operation data 334.

In some embodiments, web browser application 314 or an extension, plug-in or toolbar of the web browser application includes embedded instructions 316 including embedded document editor 318. In some embodiments, embedded document editor 318 is included in a web page (e.g., document 332-1) received from document system 108. Embedded document editor 318 modifies documents and handles data formatting and/or management tasks, at least some of which would otherwise be handled by presentation module 224 (FIG. 2).

A respective document 332 stored in local document repository 330 includes document information for display in GUI 111. In some embodiments, the respective document 332 includes embedded instructions (e.g., embedded document editor 318) for receiving document-related input from a computer user (e.g., a request to edit a displayed document or to display a different document) and for formatting document information for display in GUI 111. Alternatively, or additionally, the instructions for receiving document-related input from the computer user and/or for formatting document information for display may be implemented in web browser 314, as mentioned above, or as a stand-alone application in memory 306.

Optionally, memory 306 includes other applications or components.

FIGS. 4A-4D illustrate exemplary user interfaces, in accordance with some embodiments.

Figure 4A:
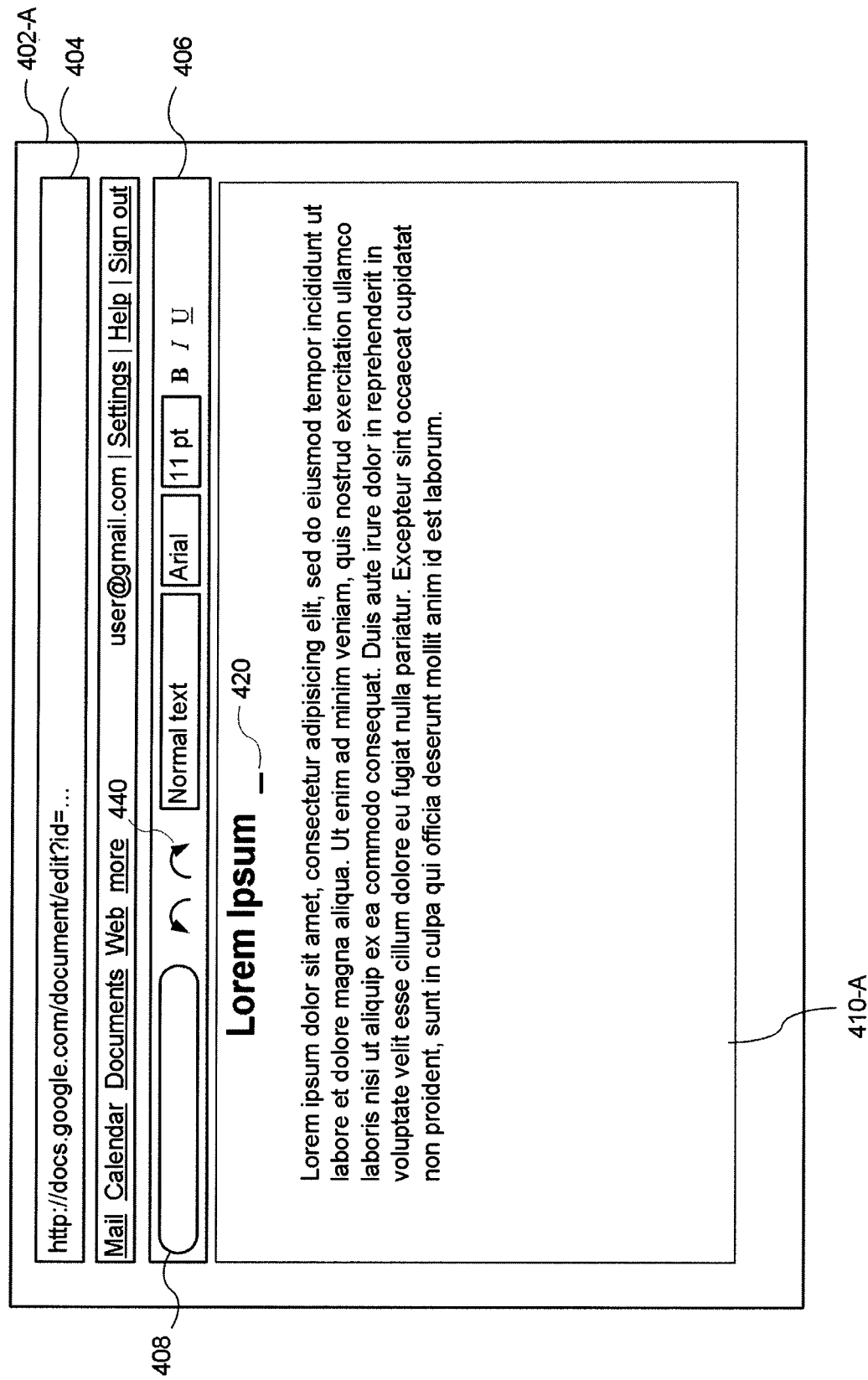
FIGS. 4A-4D illustrate exemplary user interfaces, in accordance with some embodiments.

FIG. 4A illustrates exemplary user interface 402-A displayed in GUI 111 of client 102. User interface 402-A includes display of a web page that corresponds to URL 404. As illustrated, user interface 402-A includes:

document editor menu 406, which includes document operation search region 408 (also called an "omnibox") and undo/redo icons 440; and document view 410 that includes at least a portion of a document (or a subset of document content).

Document view 410 is typically used to display document content and receive user inputs. For example, location indicator 420 (e.g., a cursor) is displayed in document view 410, and when the user types characters on keyboard 303 (FIG. 3), the typed characters are inserted into the document at a location, in the document, corresponding to a displayed location of the location indicator. In addition, the typed characters are displayed at a location, on the display, that corresponds to the displayed location of the cursor 420.

Although FIG. 4A illustrates document operation search region 408 as included in document editor menu 406, document operation search region 408 need not be included in document editor menu 406. In other words, in some embodiments, document operation search region 408 may be located at any predefined location of the user interface.

Figure 4B:
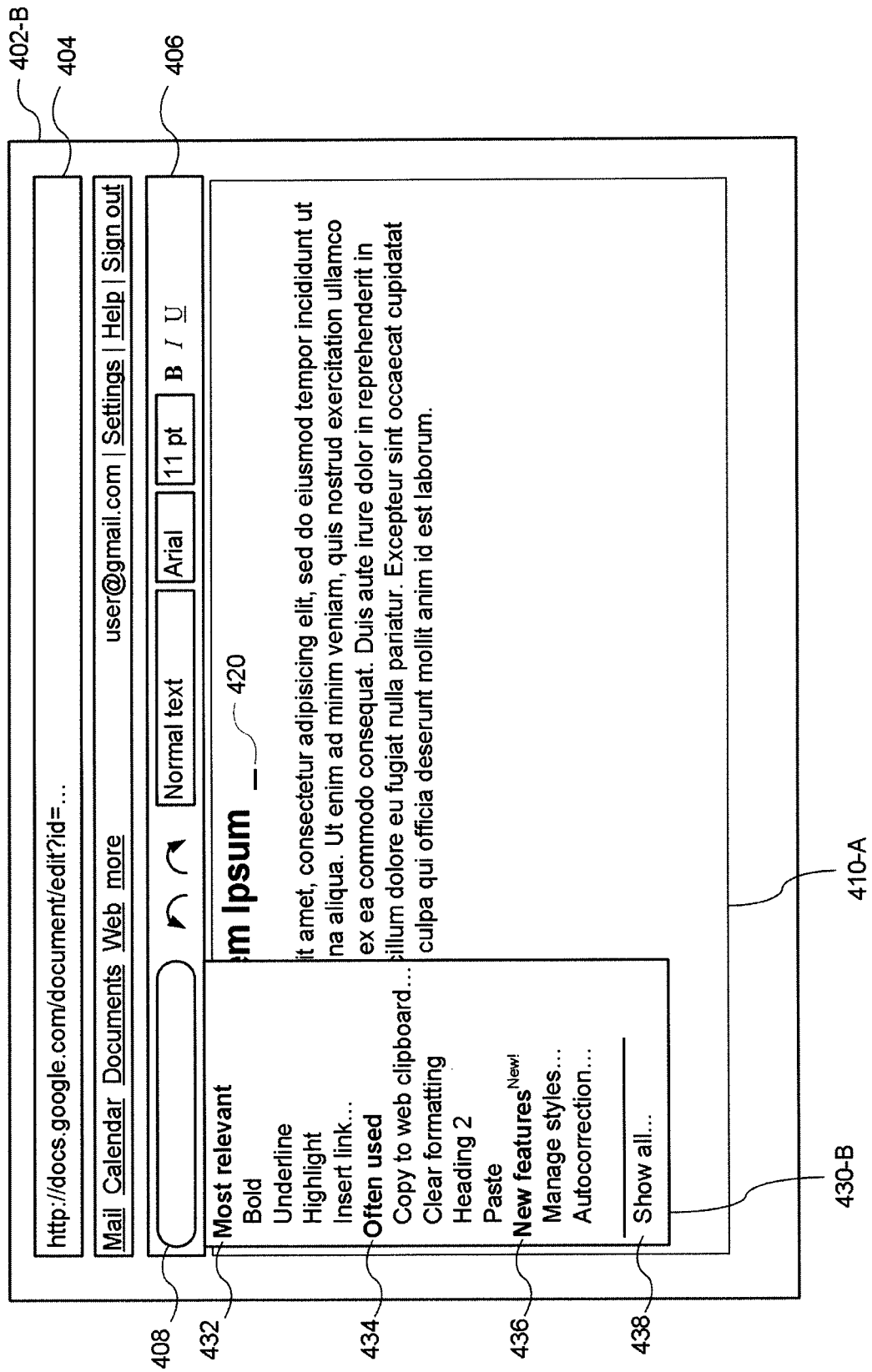

In FIG. 4B, exemplary user interface 402-B includes popup menu 430-8 displayed in response to user selection/activation of document operation search region 408. In some embodiments, document operation search region 408 is selected/activated by a user moving a mouse cursor to a location that corresponds to document operation search region 408 and clicking a mouse button. In addition, document operation search region 408 may be selected/activated by a user pressing a predefined key (e.g., an escape key). Popup menu 430-B includes a plurality of document operation labels (e.g., bold, underline, highlight, paste, etc.). Each document operation label corresponds to a respective document operation (e.g., the document operation label "bold" corresponds to a bold function, which changes a font style of text to bold; the document operation label "paste" corresponds to a paste function in a copy-and-paste operation, etc.). In some embodiments, the plurality of document operation labels is grouped into categories. For example, popup menu 430-B includes "most relevant," "often used," and "new features" categories. However, popup menu 430-B may include a subset or superset of such categories. "Most relevant" category 432 includes document operation labels corresponding to document operations that are determined to be the most relevant document operations based on predefined criteria. "Often used" category 434 includes document operation labels corresponding to document operations that are most frequently used by a respective user or a community of users. "New features" category 436 includes preselected document operation labels. Document operation labels in "new features" category 436 typically correspond to document operations that have been recently introduced or updated.

As illustrated in FIG. 4B, "bold," "underline," "highlight," and "insert link" document operations have been determined to be the most relevant. In addition, "copy to web clipboard," "clear formatting," "heading 2," and "paste" document operations are identified as most frequently used document operations. "Manage styles" and "autocorrection" document operations are identified as new features.

In some embodiments, popup menu 430-B includes menu option 438 ("Show all"), which, when selected, initiates display of a list or grid of all document operations supported by document system 108 (FIG. 1).

Figure 4C:
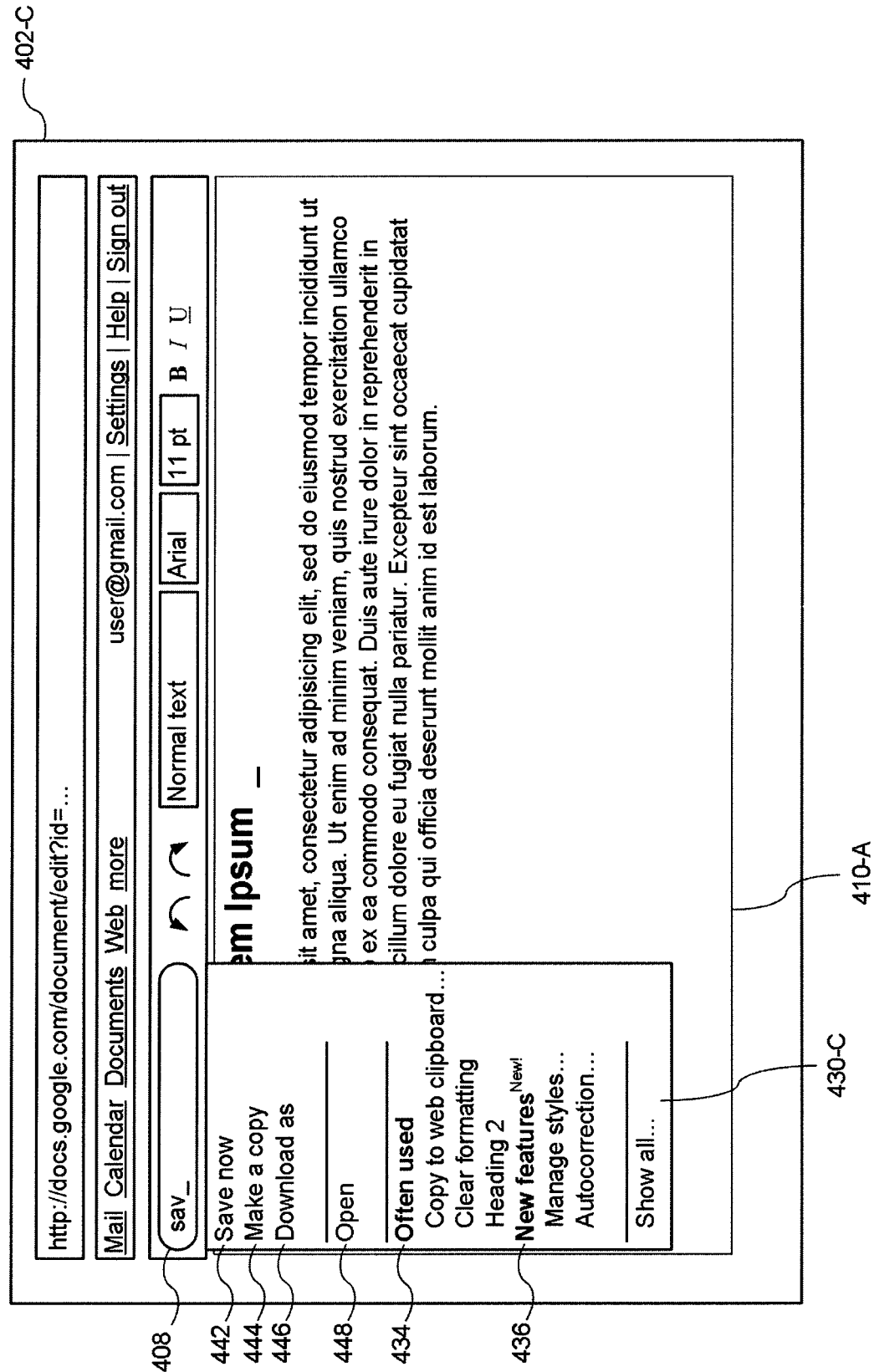

FIG. 4C illustrates exemplary user interface 402-C that includes popup menu 430-C. Popup menu 430-C is displayed after a few characters (e.g., "say") have been typed in document operation search region 408. Popup menu 430-C includes document operation labels that correspond to the typed characters or words and/or synonyms or antonyms of words that include the typed characters or words. For example, document operation label "save now" 442 includes the typed characters "say." Document operation label "make a copy" 444 may be identified as corresponding to the typed characters "say," when the document operation label "make a copy" has a synonym (e.g., in global document operation data 500) of "save as," which includes the typed characters "say." Document operation label "download as" 446 may be identified as corresponding to the typed characters "say," when the document operation label "download as" has a synonym (e.g., in global document operation data 500) of "local save," which includes the typed characters "say."

In some embodiments, popup menu 430-C includes one or more document operation labels related to the document operation labels that correspond to the typed characters (e.g., indicating similar or opposite document operations). For example, the typed characters "sav" may correspond to document operation "save now," which, when selected, stores the document into a storage (e.g., document database 118, FIG. 1 or local document repository 330, FIG. 3). In some cases, document operation "open," which, when selected, retrieves a stored document from the storage, may be preselected as a document operation related to the document operation "save now." In such cases, popup menu 430-C includes the document operation label "open" 448 as related to the typed characters.

Popup menu 430-C also includes document operation labels in both "often used" and "new features" categories (e.g., 434 and 436) as described above.

It should be noted that in some embodiments, popup menu 430-C is displayed after the user types the characters "say" without signaling completion of the search query (e.g., pressing an enter key or activating any user interface object that indicates completion of the search query). However, popup menu 430-C may also be displayed after the user types the characters "sav" and signals completion of the search query (e.g., by pressing the enter key on the keyboard).

In FIG. 4U, user interface 402-D includes document view 410-D indicating that table 412 is selected. Popup menu 430-D includes in "most relevant" category 432 a plurality of document operation labels that are related to the selected document object, table 412. For example, popup menu 430-D includes table operations, such as "insert row," "insert column," "delete row," "delete table," and "table properties" under "most relevant" category 432.

FIG. 5A is a block diagram illustrating exemplary global document operation data 500, in accordance with some embodiments. In some embodiments, global document operation data 500 is stored in document operation database 120 (FIG. 1). In some embodiments, global document operation data 500 or at least a subset thereof is stored in local document operation data 334 (FIG. 3) (e.g., as a mirror copy).

Global document operation data 500 includes a plurality of entries 502 (e.g., 502-1 through 502-7, etc.). Respective entry 502 includes respective document operation label 504. For example, entry 502-1 includes an "insert image" document operation label. Thus, entry 502-1 corresponds to a document operation that is labeled or referenced as an "insert image" operation/function.

In some embodiments, respective entry 502 includes one or more of:
frequency of use 506 representing a number of times the corresponding operation has been used by a community of users, typically within a predefined time period (e.g., within past five days);
document object type 508 indicating one or more document object types on or in which the corresponding document operation may be performed (e.g., entry 502-1 has a document object type, "document," which indicates that the "insert image" operation may be performed anywhere within a document; and entry 502-3 has a document object type, "text," which indicates that the "bold" operation may be performed with any text object);
job function information 510 that identifies a group of users to whom the corresponding operation is recommended or by whom the corresponding operation is frequently used (e.g., job function information 510 may include one or more of: one or more job functions, such as a financial analyst, one or more entity divisions or departments, such as an "accounting department" of a company, and one or more job titles, such as a CFO or senior accountant;
synonyms, similar words and/or similar document operation labels 512 (e.g., entry 502-1 includes "photo" and "picture" as synonyms of the word "image" in the document operation label "insert image");
antonyms, opposite and/or related document operation labels 514 (e.g., entry 502-5 includes "delete row" and "delete table" as document operation labels opposite to, or related to, the document operation label "insert row"); and
geographic location 516 that indicates a respective geographic location where the users within the respective geographic location most frequently used the corresponding document operation (e.g., entry 502-7 indicates that a "drucken" document operation is most frequently used by users in Germany and German speaking regions).

In some embodiments, respective entry 502 also includes a pointer to a respective set of instructions for performing the corresponding operation (e.g., entry 502-1 with document operation label "insert image" 504 may include a pointer to one or more instructions, which, when executed by one or more processors, cause a computer system to perform or at least initiate the "insert image" operation).

In some embodiments, different instances of global document operation data 500 are provided for distinct communities of users. When providing to a respective user document operation labels for popular document operations, the global document operation data 500 for a community of users associated with the respective user is used to identify the popular document operations.

Figure 5B:
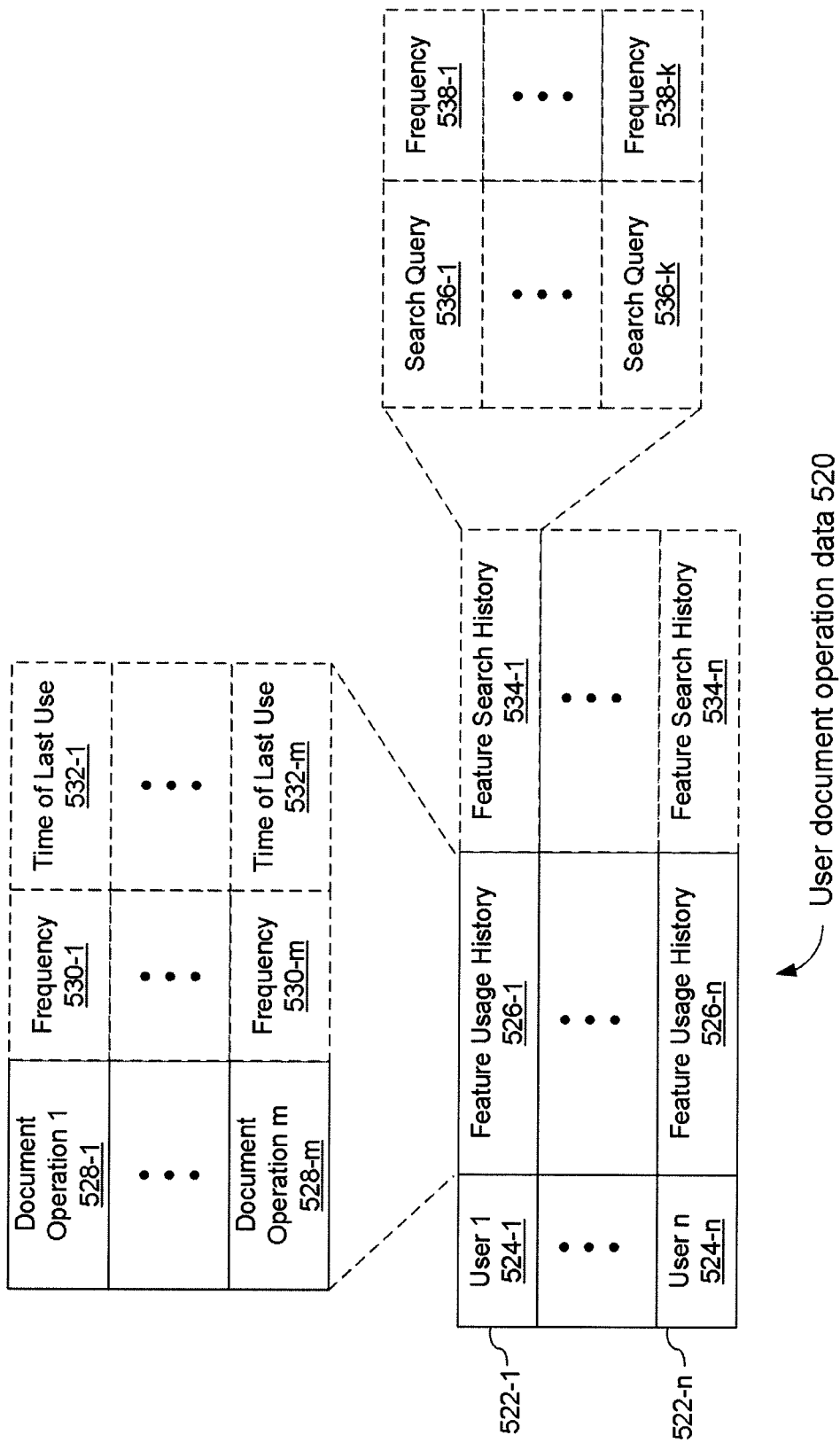

FIG. 5B is a block diagram illustrating exemplary user document operation data 520 in accordance with some embodiments. In some embodiments, user document operation data 520 is stored in document operation database 120 (FIG. 1). In some embodiments, user document operation data 520 or at least a subset thereof is stored in local document operation data 334 (FIG. 3).

Exemplary user document operation data 520 includes a plurality of entries 522 (e.g., 522-1 through 522-n, where n is a number of entries in user document operation data 520). Each entry (e.g., 522-1) includes a user or a user name (e.g., 524-1) and a respective feature usage history (e.g., 526-1).

The respective feature usage history (e.g., 526-1) includes a plurality of document operations or document operation labels (e.g., 528-1 through 528-M, where m is a number of document operations or document operation labels included in the respective feature usage history). In some embodiments, the respective feature usage history (e.g., 526-1) also includes, for a respective document operation or document operation label, one or more of:

frequency of use 530 representing a number of times the corresponding operation has been used by a respective user, typically within a predefined time period (e.g., within past five days); and time of last use 532 that indicates a time when the corresponding operation was last used by the respective user.

In some embodiments, each entry (e.g., 522-1) also includes a respective feature search history (e.g., 534-1). The respective feature search history (e.g., 534-1) typically includes a plurality of search queries (e.g., 536-1 through 536-k, where k is a number of search queries included in the respective feature search history). In some embodiments, the respective feature search history (e.g., 534-1) includes, for a respective search query, frequency of use 538 representing a number of times the corresponding search query has been submitted by the respective user, typically within a predefined time period. In some embodiments, the respective feature search history (e.g., 534-1) also includes search results of a respective search query and/or search results that have been selected by the respective user among the search results of the respective search query.

Although user document operation data 520 is depicted as a single data structure, user document operation data 520 may be stored in multiple locations, for example spread over multiple servers. For example, feature usage history 526 need not be collocated for all users.

In some embodiments, document database 118 includes document-specific document operation data, which identifies document operations that have been performed with a respective document. In some embodiments, the document-specific document operation data is used to identify one or more document operations that have been most frequently used with the respective document.

In some embodiments, user document operation data 520 or portions of user document operation data 520 are aggregated to generate global document operation data 500. In some implementations, for each of a plurality of communities of users, a corresponding subset of user document operation data 520 is aggregated to generate a respective community-specific instance of global document operation data 500.

Figure 6A:
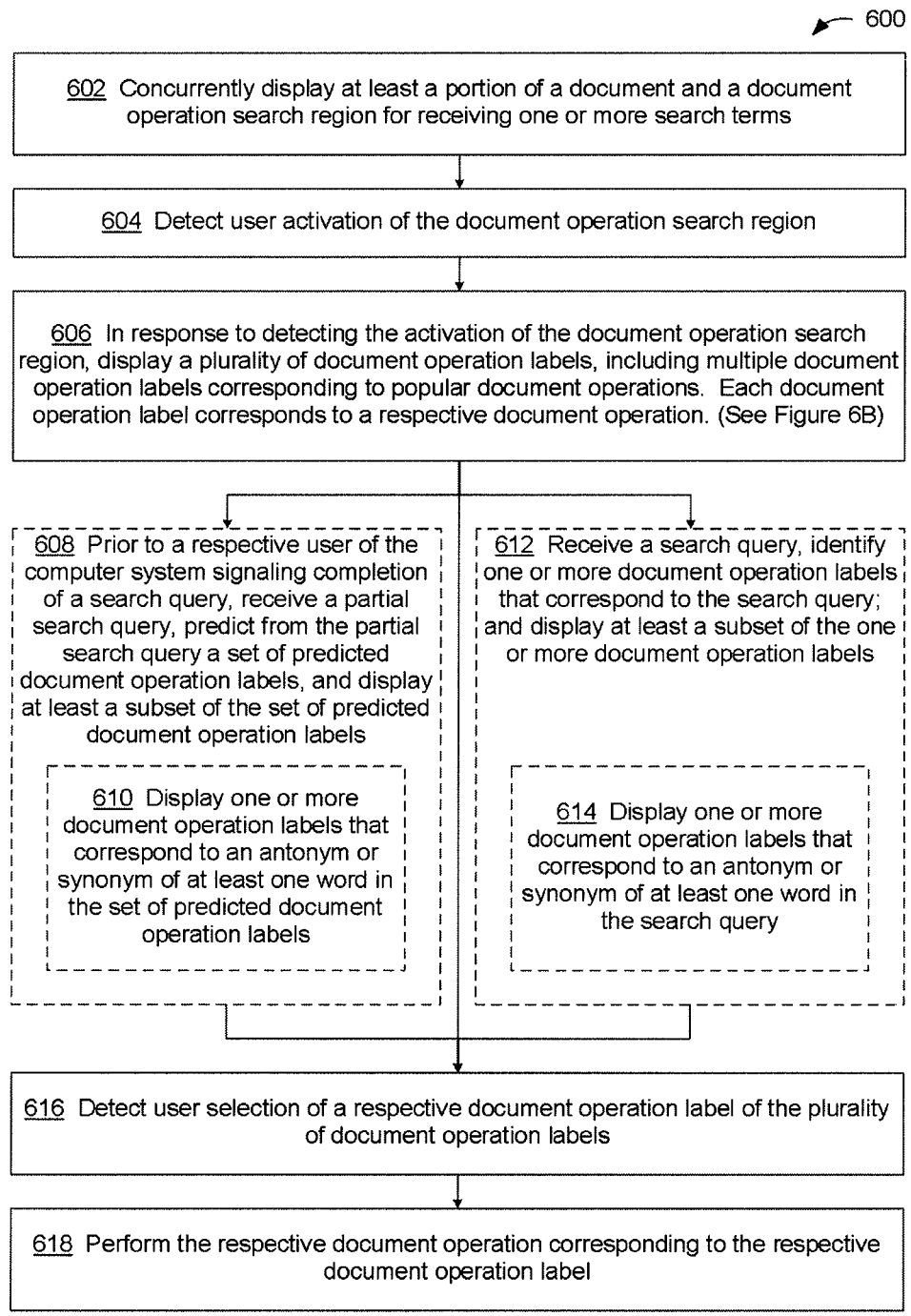

FIGS. 6A-6B are flowcharts representing method 600 for displaying a plurality of document operation labels, including multiple document operation labels corresponding to popular document operations, in accordance with some embodiments. Method 600 is performed at a computer system (e.g., client 102, FIG. 1) having one or more processors and memory storing one or more programs for execution by the one or more processors.

The system concurrently displays (602) at least a portion of a document and a document operation search region for receiving one or more search terms. For example, in FIG. 4A, document view 410-A including a portion of document is concurrently displayed with document operation search region 408. Document operation search region 408 is configured for receiving one or more search terms (e.g., a user may type search terms in document operation search region 408 as illustrated in FIG. 4C). In some embodiments, the document is a blank document (or contains a blank page). The document may be a text document, a spreadsheet, a presentation document, an image, or any other document.

The system detects (604) user activation of the document operation search region. For example, the system may detect one or more user inputs that satisfy predefined criteria (e.g., activation of a predefined key, such as an escape key, or selection of document operation search region 408 with a mouse input).

In response to detecting the activation of the document operation search region, the system displays (606) a plurality of document operation labels, including multiple document operation labels corresponding to popular document operations. For example, popup menu 430-B in FIG. 4B includes multiple document operation labels in "often used" category 434. Document operation labels in "often used" category 434 include document operation labels corresponding to popular document operations. Each document operation label corresponds to a respective document operation (e.g., respective document operations may include functions used in a text editor, a spreadsheet application, a presentation application, an image editor, or any other document viewer or editor).

In some embodiments, the multiple document operation labels corresponding to popular document operations include (620, FIG. 6B) one or more document operation labels selected in accordance with frequency of use by a community of users. As used herein, the condition "selected in accordance with frequency of use" is used to describe document operations "that meet predefined frequency of use criteria." For example, one or more document operations frequently used by a community of users refer to one or more document operations that meet predefined frequency of use criteria. In some embodiments, the community of users may be one or more of: all users of document system 108, users associated with a same organization associated with the respective user, users who are identified in contacts of the respective user, and users who have worked on a same document or documents of a same type. In some embodiments, one or more document operation labels corresponding to one or more document operations frequently used by a community of users are identified based on frequency of use 506 included in global document operation data 500 (FIG. 5A).

In some embodiments, the multiple document operation labels corresponding to popular document operations include (622) one or more document operation labels selected in accordance with frequency of use by a respective user of the computer system. In some embodiments, one or more document operation labels corresponding to one or more document operations frequently used by a respective user are identified based on frequency of use 530 included in user document operation data 520 (FIG. 5B).

In some embodiments, the plurality of document operation labels further includes (624) one or more suggested document operation labels distinct from the multiple document operation labels corresponding to popular document operations. For example, as illustrated in FIG. 4B, popup menu 430-B includes multiple document operation labels in "most relevant" category 432. In FIG. 413, the document operation labels in "most relevant" category are distinct from document operation labels in "often used" category 434. The suggested document operation labels are identified in accordance with predefined criteria. In some embodiments, the suggested document operation labels are document operation labels suggested independently of the frequency of use.

In some embodiments, the system concurrently displays (626) a location indicator that corresponds to a respective location of the document. For example, location indicator 420 (e.g., a cursor) is concurrently displayed in FIG. 4B. The one or more suggested document operation labels comprise at least one document operation label selected in accordance with the respective location corresponding to the location indicator. For example, when location indicator 420 is located next to bold text (e.g., FIG. 4B), popup menu 430-B may include "bold" document operation label so that a user may choose whether to display subsequent text in bold fonts. In another example, when location indicator 420 is located next to emphasized text (e.g., in bold fonts), document operation labels corresponding to document operations that may be used to emphasize text (e.g., underline or highlight) may be displayed. In yet another example, when location indicator 420 is located in a table, document operation labels that correspond to table operations may be displayed (e.g., "insert row," "insert column," "delete table," "table properties," etc.).

In some embodiments, the one or more suggested document operation labels include (628) at least one document operation label selected in accordance with the displayed portion of the document. For example, when the displayed portion includes a correspondence closing remark or phrase (e.g., "sincerely yours"), the system may display one or more document operation labels related to a signature (e.g., "insert a signature"). In another example, when the displayed portion includes a table, document operation labels that correspond to table operations may be displayed. In yet another example, when the displayed portion includes a blank page (e.g., when no text has been entered), one or more document operation labels that are related to text styles may be displayed (e.g., heading styles).

In some embodiments, the system concurrently displays (630) a location indicator that corresponds to a respective location of the document. The one or more suggested document operation labels include at least one document operation label selected independently of the respective location corresponding to the location indicator or the displayed portion of the document. For example, one or more document operation labels for collaboration operations may be displayed when a collaborator logs into document system 108. In another example, one or more document operation labels related to one or more recently performed document operations/functions may be displayed (e.g., last used document operation and/or document operations related to the last used document operation).

In some embodiments, the one or more suggested document operation labels include (632) at least one document operation label selected in accordance with a selected document object in the document (e.g., a word or phrase, table, drawing object such as an arrow, etc.). For example, in FIG. 4D, while table object 412 is selected, document operation labels corresponding to table operations (e.g., "insert row," "insert column," "delete row," "delete table," and "table properties") are displayed.

In some embodiments, the plurality of document operation labels includes (634) one or more promoted document operation labels distinct from the multiple document operation labels corresponding to popular document operations. For example, the one or more promoted document operation labels may correspond to one or more document operations that are preselected by document system 108 or an operator of document 108 based on recency of when the one or more corresponding document operations were added or updated. In some embodiments, the one or more promoted document operation labels include a document operation label corresponding to the most recently added document operation.

Referring back to FIG. 6A, in some embodiments, prior to a respective user of the computer system signaling completion of a search query (e.g., pressing an enter key or activating any user interface object that indicates completion of the search query), the system receives (608) a partial search query (e.g., characters "sav" in FIG. 4C), predicts from the partial search query a set of predicted document operation labels (e.g., "save now," "make a copy," "download as," etc.), and displays at least a subset of the set of predicted document operation labels.

In some embodiments, the system displays (610) one or more document operation labels that correspond to an antonym or synonym of at least one word in the set of predicted document operation labels. For example, when the set of predicted document operation labels includes a word "close," a document operation label that includes an antonym "open" may be displayed. In another example, when the set of predicted document operation labels includes a word "image," one or more document operation labels that include "photo" and/or "picture" may be displayed. In some embodiments, the system retrieves one or more antonyms and/or one or more synonyms from a document operation data structure (e.g., a data structure storing global document operation data 500, FIG. 5A). Alternatively, the system may retrieve one or more antonyms and/or one or more synonyms from a distinct dictionary server configured to provide one or more antonyms and/or one or more synonyms.

In some embodiments, the system receives (612) a search query (e.g., after the respective user of the computer system signaling completion of the search query), identifies one or more document operation labels that correspond to the search query, and displays at least a subset of the one or more document operation labels.

In some embodiments, the system displays (614) one or more document operation labels that correspond to an antonym or synonym of at least one word in the search query.

The system detects (616) user selection of a respective document operation label of the plurality of document operation labels. For example, the user may use one or more input devices (e.g., a mouse or arrow keys in a keyboard) to select the respective document operation label (e.g., "save now" document operation label 442, FIG. 4C).

The system performs (618) the respective document operation corresponding to the respective document operation label. For example, in response to the user selection of "save now" document operation label 442, the system saves the document (e.g., into local document repository 330, FIG. 3 or document database 118, FIG. 1).

Note that details of the processes described above with respect to method 600 are also applicable in an analogous manner to the other methods described herein, including methods 700, 800, and 900 described below. For brevity, these details are not repeated below.

Figure 7:
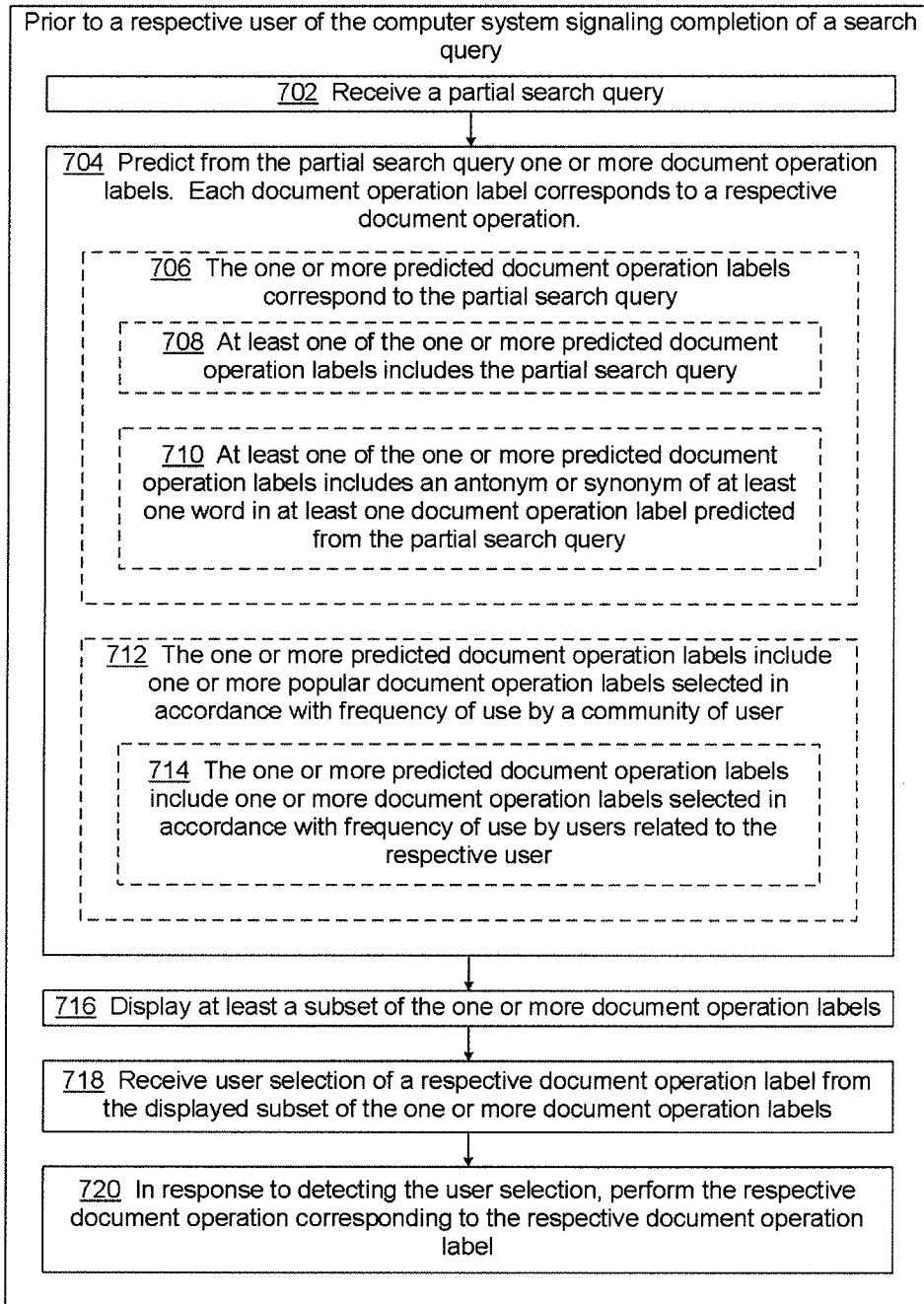
FIG. 7 is a flowchart representing a method for predicting one or more document operation labels from a partial search query, in accordance with some embodiments.

FIG. 7 is a flowchart representing method 700 for predicting one or more document operation labels from a partial search query, in accordance with some embodiments. Method 700 is performed by a computer system (e.g., client 102, FIG. 1) having one or more processors and memory storing one or more programs for execution by the one or more processors.

Prior to a respective user of the computer system signaling completion of a search query, the system receives (702) a partial search query (e.g., the characters "sav" in FIG. 4C), and predicts (704) from the partial search query one or more document operation labels, where each document operation label corresponds to a respective document operation (e.g., "save now," "make a copy," and "download as").

In some embodiments, the one or more predicted document operation labels correspond (706) to the partial search query. For example, a respective predicted document operation label may match or include the partial search query.

In some embodiments, at least one of the one or more predicted document operation labels includes (708) the partial search query. As shown in FIG. 4C, the predicted document operation label "save now" includes the partial search query "sav."

In some embodiments, at least one of the one or more predicted document operation labels includes (710) an antonym or synonym of at least one word in at least one document operation label predicted from the partial search query. For example, when the one or more predicted document operation labels include a word "close," a document operation label that includes an antonym "open" may be displayed.

In some embodiments, the one or more predicted document operation labels include (712) one or more popular document operation labels selected in accordance with frequency of use by a community of user (e.g., document operation labels under "often used" category 434. FIG. 4C). In some embodiments, the one or more popular document operation labels corresponding to one or more document operations frequently used by a community of users are identified based on frequency of use 506 included in global document operation data 500 (FIG. 5A).

In some embodiments, the one or more predicted document operation labels include (714) one or more document operation labels selected in accordance with frequency of use by users related to the respective user. In some embodiments, the users related to the respective user are identified based on information in user information database 116, the respective user's job function, and/or one or more organizations associated with the respective user.

The system displays (716) at least a subset of the one or more document operation labels (e.g., FIG. 4C).

The system receives (718) user selection of a respective document operation label from the displayed subset of the one or more document operation labels. For example, the user may use one or more input devices (e.g., a mouse or arrow keys in a keyboard) to select the respective document operation label (e.g., "save now" document operation label 442).

The system, in response to detecting the user selection, performs (720) the respective document operation corresponding to the respective document operation label. For example, in response to the user selection of "save now" document operation label 442, the system saves the document (e.g., into local document repository 330, FIG. 3 or document database 118, FIG. 1).

Note that details of the processes described above with respect to method 700 are also applicable in an analogous manner to the other methods described herein, including methods 800 and 900 described below. For brevity, these details are not repeated below.

Figure 8:
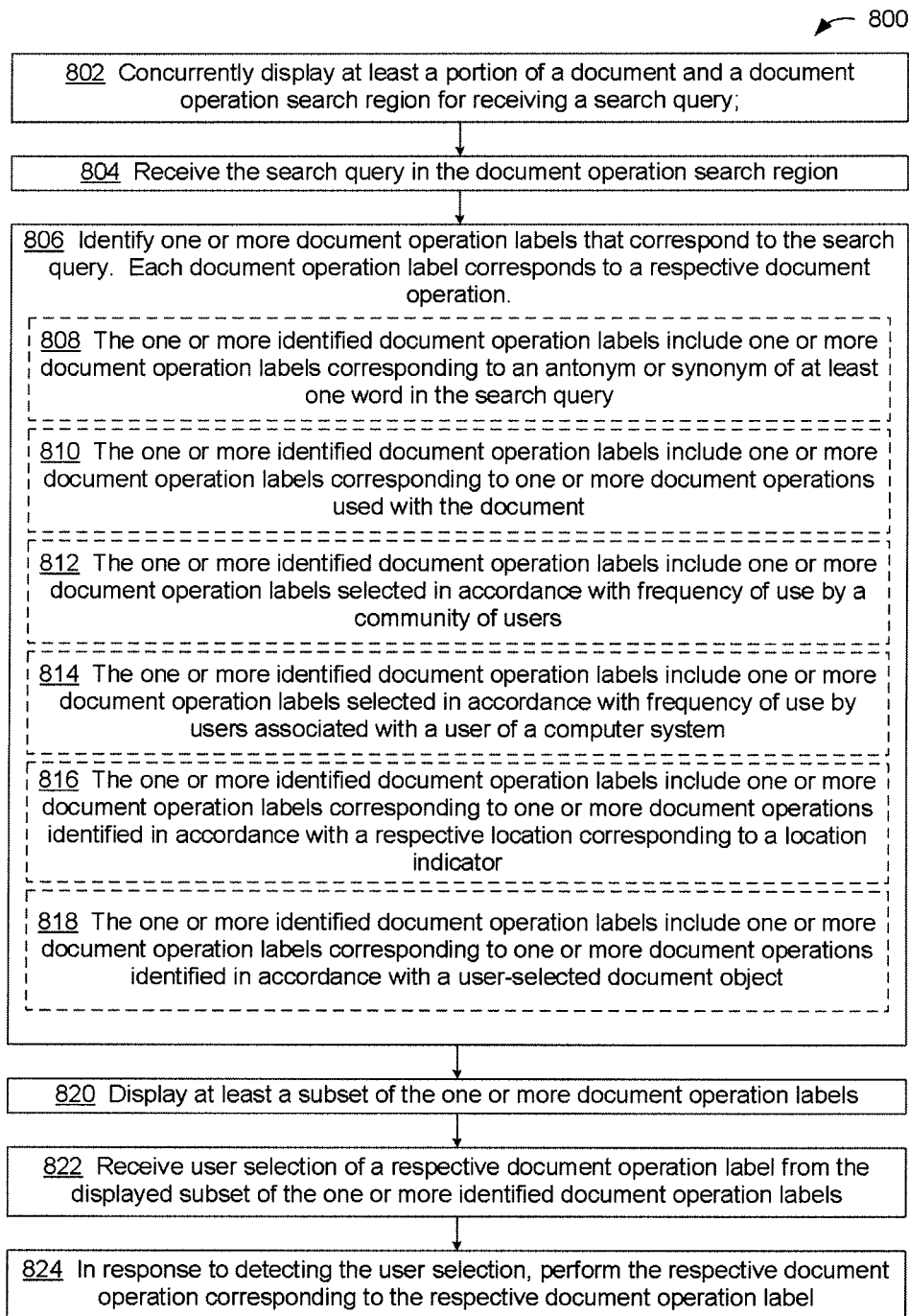
FIG. 8 is a flowchart representing a method for identifying one or more document operation labels that correspond to a search query, in accordance with some embodiments.

FIG. 8 is a flowchart representing method 800 for identifying one or more document operation labels that correspond to a search query, in accordance with some embodiments. Method 800 is performed by a computer system (e.g., client 102, FIG. 1) having one or more processors and memory storing one or more programs for execution by the one or more processors.

The system concurrently displays (802) at least a portion of a document and a document operation search region for receiving a search query (e.g., FIG. 4A).

The system receives (804) the search query in the document operation search region (e.g., characters "sav" in FIG. 4C).

The system identifies (806) one or more document operation labels that correspond to the search query. Each document operation label corresponds to a respective document operation.

In some embodiments, the one or more identified document operation labels include (808) one or more document operation labels corresponding to an antonym or synonym of at least one word in the search query (e.g., based on similar words and/or similar document operation labels 512 and/or opposite and/or related document operation labels 514).

In some embodiments, the one or more identified document operation labels include (810) one or more document operation labels corresponding to one or more document operations used with the document. For example, the one or more identified document operation labels may include a document operation label corresponding to the most recently used document operation. In another example, the one or more identified document operations may include a document operation label corresponding to a document operation that has been most frequently used with the document. In some embodiments, the one or more document operation labels corresponding to the one or more document operations used with the document may be identified using a document-specific document operation (discussed above with respect to FIGS. 5A-5I) and a redo stack and/or an undo stack (described below with respect to operation 928, FIG. 9B).

In some embodiments, the one or more identified document operation labels include (812) one or more document operation labels selected in accordance with frequency of use by a community of users (e.g., based on frequency of use 506, FIG. 5A).

In some embodiments, the one or more identified document operation labels include (814) one or more document operation labels selected in accordance with frequency of use by users associated with a user of the computer system (e.g., based on frequency of use 530, FIG. 5B).

In some embodiments, the one or more identified document operation labels include (816) one or more document operation labels corresponding to one or more document operations identified in accordance with a respective location corresponding to a location indicator (e.g., location indicator 420, FIG. 4C).

Figure 4D:
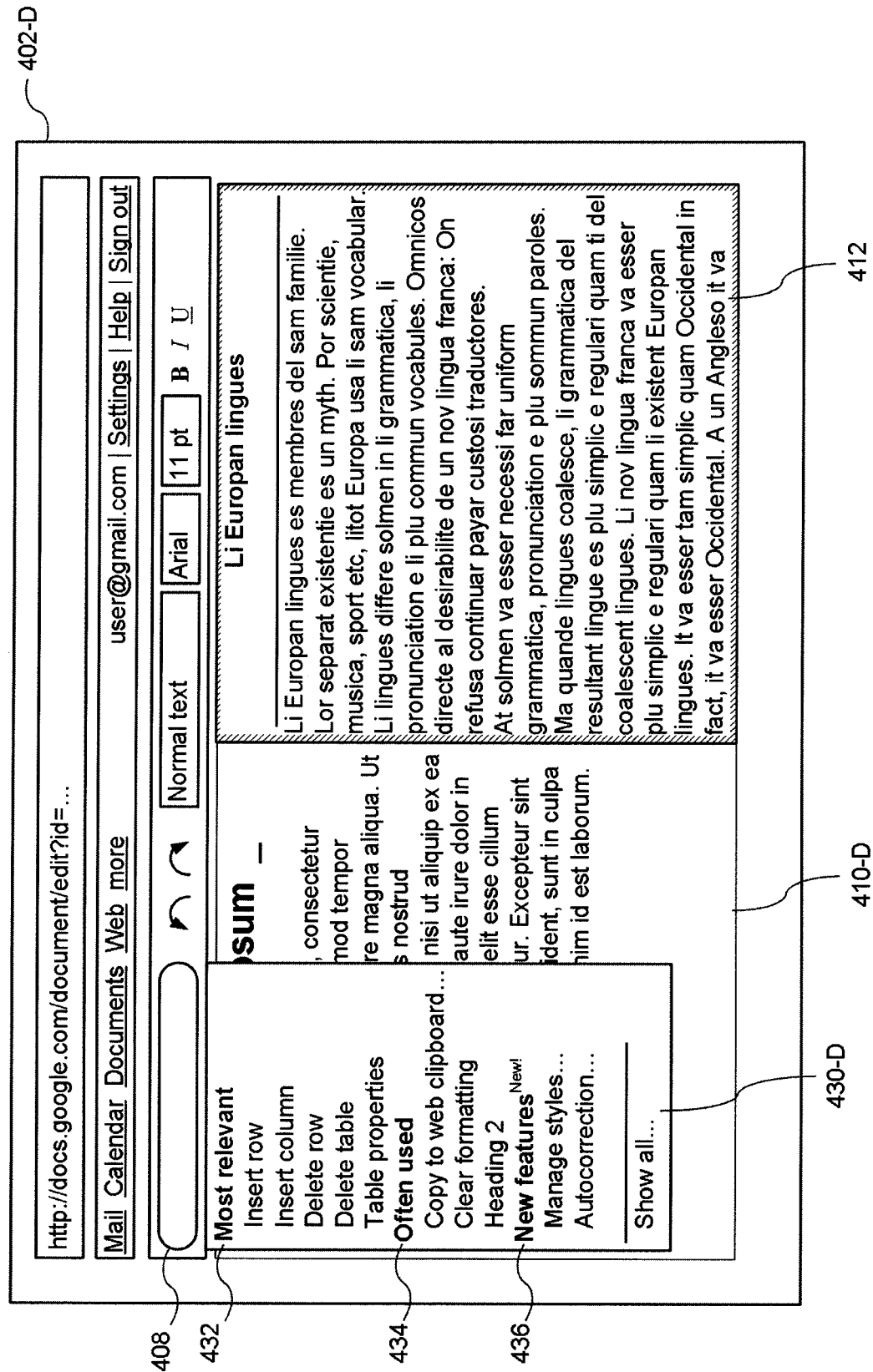

In some embodiments, the one or more identified document operation labels include (818) one or more document operation labels corresponding to one or more document operations identified in accordance with a user-selected document object (e.g., table 412, FIG. 4D).

The system displays (820) at least a subset of the one or more document operation labels (e.g., popup menu 430-C, FIG. 4C or popup menu 430-D, FIG. 4D).

The system receives (822) user selection of a respective document operation label from the displayed subset of the one or more identified document operation labels (e.g., based on mouse or keyboard inputs).

The system, in response to detecting the user selection, performs (824) the respective document operation corresponding to the respective document operation label.

Note that details of the processes described above with respect to method 800 are also applicable in an analogous manner to the other methods described herein, including method 900 described below. For brevity, these details are not repeated below.

Figure 9A:
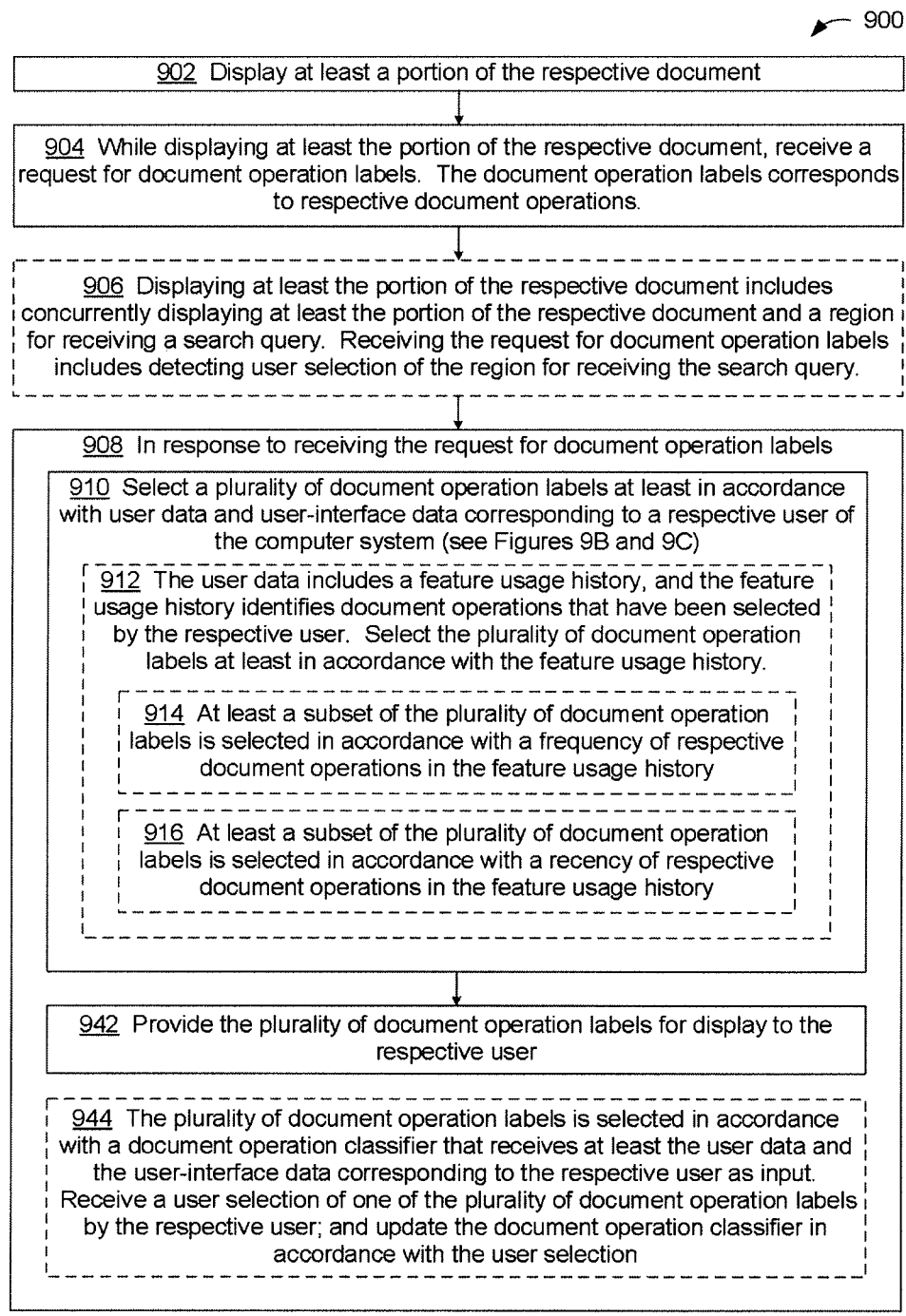

FIGS. 9A-9C are flowcharts representing method 900 for selecting a plurality of document operation labels, in accordance with some embodiments. Method 900 is performed at a computer system (e.g., client 102, FIG. 1) having one or more processors and memory storing one or more programs for execution by the one or more processors.

The system displays (902) at least a portion of the respective document (e.g., FIG. 4A).

While displaying at least the portion of the respective document, the system receives (904) a request for document operation labels. The document operation labels correspond to respective document operations. For example, the request may include a selection of a region for receiving a search query (e.g., document operation search region 408, FIG. 4A), a right-click of a mouse, an initiation of help content search (e.g., by pressing a predefined key on a keyboard or by selection of a menu option for help content search), or a refresh of a dynamic toolbar (e.g., after a predefined time interval or in response to an occurrence of one of predefined triggering events, such as when a collaborator logs into document system 108).

In some embodiments, displaying at least the portion of the respective document includes (906) concurrently displaying at least the portion of the respective document and a region for receiving a search query (e.g., document operation search region 408, FIG. 4A), and receiving the request for document operation labels includes detecting user selection of the region for receiving the search query.

In response to receiving the request for document operation labels (908), the device selects (910) a plurality of document operation labels at least in accordance with user data and user-interface data corresponding to a respective user of the computer system (e.g., information in user information database 116 and document operation database 120 (FIG. 1) that corresponds to the respective user, such as feature usage history 526 (FIG. 5B) of the respective user). In some embodiments, the user-interface data includes one or more of: one or more visible objects in a respective document, one or more selected objects in the respective document, a respective cursor location in the respective document, document operations or document operation labels in an undo stack and/or a redo stack for the respective document. In some embodiments, the user-interface data is stored in local document repository 330 (FIG. 3) or any other part of memory 306.

In some embodiments, the user data includes (912) a feature usage history (e.g., feature usage history 526, FIG. 5B), and the feature usage history identifies document operations that have been selected by the respective user. The system selects the plurality of document operation labels at least in accordance with the feature usage history.

In some embodiments, at least a subset of the plurality of document operation labels is selected (914) in accordance with a frequency of respective document operations in the feature usage history. For example, frequency of use 530 (FIG. 5B) may be used to select the subset of document operation labels.

In some embodiments, at least a subset of the plurality of document operation labels is selected (916) in accordance with a recency of respective document operations in the feature usage history. For example, time of last use 532 (FIG. 5B) may be used to select the subset of document operation labels.

In some embodiments, the user data identifies (918, FIG. 9B) a geographic location of the respective user (e.g., city and/or country). The system selects at least a subset of the plurality of document operation labels in accordance with the location of the respective user. For example, the system may identify document operation labels that correspond to document operations frequently used by users who are located in the same geographic location as the respective user. In some cases, such document operation labels may include document operation labels in a language that is used in the geographic location of the respective user.

In some embodiments, the user data identifies (920) a job function of the respective user. In some embodiments, the job function of the respective user identifies a job title of the respective user. In some embodiments, the job function of the respective user identifies a work group of the respective user (e.g., finance, IT, etc.). The system selects at least a subset of the plurality of document operation labels in accordance with the job function of the respective user. For example, the system may identify document operation labels that correspond to document operations frequently used by users who have the same job title as the respective user (e.g., "pivot table" operation for accountants). Similarly, the system may identify document operation labels that correspond to document operations frequently used by users who belong to the same work group as the respective user.

In some embodiments, the user data includes (922) a feature search history (e.g., feature search history 534, FIG. 5B). The feature search history identifies a plurality of search queries that have been used by the respective user to identify one or more document operations (e.g., search queries 536-1 through 536-k). The system selects at least a subset of the plurality of document operation labels in accordance with the feature search history. For example, the system may identify popular search queries in the plurality of search queries, and select document operation labels corresponding to the popular search queries. In some embodiments, the feature search history includes results of a plurality of prior search queries. In some embodiments, the feature search history includes one or more results selected by a respective user among the results of the plurality of prior search queries.

In some embodiments, the user interface data identifies (924) one or more visible objects in the respective document. The system selects at least a subset of the plurality of document operation labels in accordance with at least one of the one or more visible objects. In some embodiments, certain document objects in the respective document may be hidden (by default or based on user selection). In selecting the subset of document operation labels, the system ignores document objects that are not visible (e.g., hidden). For example, when the document view includes a visible table (e.g., FIG. 4D), the system may select document operation labels corresponding to table operations (e.g., "insert a row," etc.). However, even when the document includes a table, if the table is not visible (e.g., due to its display property and/or because the table is not located within a displayed portion of the document), the system may not select document operation labels corresponding to the table operations.

In some embodiments, the user interface data identifies (926) one or more selected objects in the respective document. The system selects at least a subset of the plurality of document operation labels in accordance with at least one of the one or more selected objects. For example, when table 412 is selected, document operation labels corresponding to table operations are selected (FIG. 4D).

In some embodiments, the system maintains an undo stack and a redo stack. When a user selects an undo icon in undo/redo icons 440, a most recently performed document operation is undone. Thereafter, when the user selects a redo icon in undo/redo icons 440, a previously undone document operation is performed again. The undo stack includes information about one or more document operations that may be undone (e.g., document operations that have been performed recently), and the redo stack includes information about one or more undone document operations that may be redone. In some embodiments, the user interface data identifies (928) one or more document operation labels in an undo stack or a redo stack. The system selects at least a subset of the plurality of document operation labels in accordance with at least one of the one or more document operation labels in the undo stack or the redo stack.

In some embodiments, the user interface data identifies (930) a cursor location in the respective document. The system selects at least a subset of the plurality of document operation labels in accordance with the cursor location in the respective document.

In some embodiments, the system receives (932, FIG. 9C) a search query from the respective user, and selects at least a subset of the plurality of document operation labels in accordance with: the search query, user data and user-interface data corresponding to the respective user, and user data and user-interface data corresponding to a community of users. For example, the system may select one or more document operation labels that correspond to the search query, one or more document operation labels that correspond to document operations frequently used by the respective user, and one or more document operation labels that correspond to document operations frequently used by the community of users.

In some embodiments, the system receives (934) a search query from the respective user; and identifies candidate document operation labels including: one or more document operation labels selected in accordance with the search query, one or more document operation labels selected in accordance with user data corresponding to the respective user (e.g., one or more document operation labels corresponding to one or more document operations frequently used by the respective user), one or more document operation labels selected in accordance with user-interface data corresponding to the respective user (e.g., one or more document operation labels corresponding to one or more document operations associated with a document object selected by the respective user), one or more document operation labels selected in accordance with user data corresponding to a community of users (e.g., one or more document operation labels corresponding to one or more document operations frequently used by the community of users), and one or more document operation labels selected in accordance with user-interface data corresponding to the community of users (e.g., one or more document operation labels corresponding to one or more document operations associated with one or more document objects (or their object type) that the community of users has frequently selected). The system selects at least a subset of the candidate document operation labels for display to the respective user.

In some embodiments, the system selects (936) one or more document operation labels corresponding to one or more document operations used with respect to one or more documents related to the respective document. For example, all documents that have been authored by a same user may be deemed to be related to one another. In another example, all documents that have been accessed by the respective user may be deemed to be related to one another.

In some embodiments, the one or more related documents and the respective document are included (938) in a same document collection (e.g., a same folder or a same category).

In some embodiments, each document is associated (940) with a respective domain, and the one or more related documents and the respective document are associated with a same domain. For example, the one or more related documents and the respective document may be authored or accessed by users associated with the same domain (e.g., a school or company).

In some embodiments, a related document and the respective document are contextually related. Provide examples of contextual relationship (e.g., same author, same category, common sentence/paragraph, common keywords in the title, abstract, or document, same or similar timestamps (authoring, editing, or viewing), etc.

Referring back to FIG. 9A, the system provides (942) the plurality of document operation labels for display to the respective user (e.g., FIGS. 4B-4D).

In some embodiments, the plurality of document operation labels is selected (944) in accordance with a document operation classifier that receives at least the user data and the user-interface data corresponding to the respective user as input. The system receives a user selection of one of the plurality of document operation labels by the respective user, and updates the document operation classifier in accordance with the user selection. For example, the system may maintain one or more scores for each document operation label, and the classifier may select the plurality of document operation labels in accordance with the one or more scores. Thereafter, the system may adjust the one or more scores in response to the user selection of one of the plurality of document operation labels (e.g., increase at least one of the one or more scores when the respective user selects the respective document operation label, and decrease at least one of the one or more scores when the respective user selects a different document operation label), thereby updating the document operation classifier. This allows the document operation classifier to present document operation labels that are more likely to be selected by the respective user (based on the respective user's prior selections), and thus heuristically improves the efficiency of the human-machine interface.

The foregoing description, for purpose of explanation, has been described with reference to specific embodiments. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   providing, by a server, for display at a user device associated with a user a graphical user interface (GUI) of an electronic document editor application of an electronic document system, the GUI comprising a document view to display at least a portion of an electronic document that is editable by the user of a first plurality of users and a GUI element identifying a search region to receive one or more search terms;
   receiving, by the server of the electronic document system, an indication of a user activation of the GUI element identifying the search region;

responsive to receiving the indication of the user activation of the GUI element identifying the search region, determining a subset of document operations, among a plurality of document operations, based on one or more criteria, wherein a first criterion of the one or more criteria is based on user data corresponding to the user rather than based on text of a search query associated with the search region; and providing, to the user device, an indication of the subset of document operations for display at the GUI as GUI elements identifying commands for user selection.

2. The method of claim 1, wherein determining the subset of document operations, among the plurality of document operations, based on the one or more criteria, comprises:
identifying a feature usage history indicating a number of times a corresponding document operation of the plurality of document operations has been selected by the user; and
determining, among the plurality of document operations, first document operations of the subset of document operations that satisfy a frequency of use criterion based on the feature usage history.

3. The method of claim 1, wherein determining the subset of document operations, among the plurality of document operations, based on the one or more criteria, comprises:
identifying a geographic location associated with the user; and
determining, among the plurality of document operations, second document operations of the subset of document operations corresponding with the geographic location of the user.

4. The method of claim 3, wherein determining, among the plurality of document operations, the second document operations of the subset of document operations corresponding with the geographic location of the user, comprises:
determining that the second document operations satisfy a frequency of use criterion based on the frequency of use of the second document operations by other users located in a same geographic location.

5. The method of claim 1, wherein determining the subset of document operations, among the plurality of document operations, based on the one or more criteria, comprises:
identifying a job function associated with the user; and
determining, among the plurality of document operations, third document operations of the subset of document operations corresponding with the job function of the user.

6. The method of claim 1, wherein determining the subset of document operations, among the plurality of document operations, based on the one or more criteria, comprises:
identifying a feature search history identifying one or more search queries; and
determining, among the plurality of document operations, fourth document operations of the subset of document operations that include one or more document operations selected among results of the one or more search queries.

7. The method of claim 1, wherein determining the subset of document operations, among the plurality of document operations, based on the one or more criteria, comprises:
identifying a document object inputted into the portion of the electronic document by the at least one of the first plurality of users; and
determining, among the plurality of document operations, fifth document operations of the subset of document operations that are related to the document object.

8. The method of claim 1, wherein determining the subset of document operations, among the plurality of document operations, based on the one or more criteria, comprises:
identifying a feature usage history indicating previous usage of the plurality of document operations; and
determining, among the plurality of document operations, the subset of document operations that satisfy a recency of use criterion based on the feature usage history.

9. A system, comprising:
a memory; and
one or more processors, coupled to the memory, configured to perform operations comprising:
providing, by a server, for display at a user device associated with a user a graphical user interface (GUI) of an electronic document editor application of an electronic document system, the GUI comprising a document view to display at least a portion of an electronic document that is editable by the user of a first plurality of users and a GUI element identifying a search region to receive one or more search terms;
receiving, by the server of the electronic document system, an indication of a user activation of the GUI element identifying the search region;
responsive to receiving the indication of the user activation of the GUI element identifying the search region, determining a subset of document operations, among a plurality of document operations, based on one or more criteria, wherein a first criterion of the one or more criteria is based on user data corresponding to the user rather than based on text of a search query associated with the search region; and
providing, to the user device, an indication of the subset of document operations for display at the GUI as GUI elements identifying commands for user selection.

10. The system of claim 9, wherein determining the subset of document operations, among the plurality of document operations, based on the one or more criteria, comprises:
identifying a feature usage history indicating a number of times a corresponding document operation of the plurality of document operations has been selected by the user; and
determining, among the plurality of document operations, first document operations of the subset of document operations that satisfy a frequency of use criterion based on the feature usage history.

11. The system of claim 9, wherein determining the subset of document operations, among the plurality of document operations, based on the one or more criteria, comprises:
identifying a geographic location associated with the user; and
determining, among the plurality of document operations, second document operations of the subset of document operations corresponding with the geographic location of the user.

12. The system of claim 11, wherein determining, among the plurality of document operations, the second document operations of the subset of document operations corresponding with the geographic location of the user, comprises:
determining that the second document operations satisfy a frequency of use criterion based on the frequency of use of the second document operations by other users located in a same geographic location.

13. The system of claim 9, wherein determining the subset of document operations, among the plurality of document operations, based on the one or more criteria, comprises:
identifying a job function associated with the user; and determining, among the plurality of document operations, third document operations of the subset of document operations corresponding with the job function of the user.

14. The system of claim 9, wherein determining the subset of document operations, among the plurality of document operations, based on the one or more criteria, comprises:
identifying a feature search history identifying one or more search queries; and
determining, among the plurality of document operations, fourth document operations of the subset of document operations that include one or more document operations selected among results of the one or more search queries.

15. The system of claim 9, wherein determining the subset of document operations, among the plurality of document operations, based on the one or more criteria, comprises:
identifying a document object inputted into the portion of the electronic document by the at least one of the first plurality of users; and
determining, among the plurality of document operations, fifth document operations of the subset of document operations that are related to the document object.

16. A non-transitory computer-readable storage medium comprising instruction that, responsive to execution by one or more processors, cause the one or more processor to perform operations comprising:
providing, by a server, for display at a user device associated with a user a graphical user interface (GUI) of an electronic document editor application of an electronic document system, the GUI comprising a document view to display at least a portion of an electronic document that is editable by the user of a first plurality of users and a GUI element identifying a search region to receive one or more search terms;
receiving, by the server of the electronic document system, an indication of a user activation of the GUI element identifying the search region;
responsive to receiving the indication of the user activation of the GUI element identifying the search region, determining a subset of document operations, among a plurality of document operations, based on one or more criteria, wherein a first criterion of the one or more criteria is based on user data corresponding to the user rather than based on text of a search query associated with the search region; and
providing, to the user device, an indication of the subset of document operations for display at the GUI as GUI elements identifying commands for user selection.

17. The non-transitory computer-readable storage medium of claim 16, wherein determining the subset of document operations, among the plurality of document operations, based on the one or more criteria, comprises:
identifying a feature usage history indicating a number of times a corresponding document operation of the plurality of document operations has been selected by the user; and
determining, among the plurality of document operations, first document operations of the subset of document operations that satisfy a frequency of use criterion based on the feature usage history.

18. The non-transitory computer-readable storage medium of claim 16, wherein determining the subset of document operations, among the plurality of document operations, based on the one or more criteria, comprises:
identifying a geographic location associated with the user; and
determining, among the plurality of document operations, second document operations of the subset of document operations corresponding with the geographic location of the user.

19. The non-transitory computer-readable storage medium of claim 16, wherein determining the subset of document operations, among the plurality of document operations, based on the one or more criteria, comprises:
identifying a job function associated with the user; and
determining, among the plurality of document operations, third document operations of the subset of document operations corresponding with the job function of the user.

20. The non-transitory computer-readable storage medium of claim 16, wherein determining the subset of document operations, among the plurality of document operations, based on the one or more criteria, comprises:
identifying a feature search history identifying one or more search queries; and
determining, among the plurality of document operations, fourth document operations of the subset of document operations that include one or more document operations selected among results of the one or more search queries.

* * * * *